US012770983B2

(12) United States Patent
Jacobs

(10) Patent No.: US 12,770,983 B2
(45) Date of Patent: Oct. 20, 2026

(54) CURRENT COLLECTOR ASSEMBLIES

(71) Applicant: Rivian IP Holdings, LLC, Plymouth, MI (US)

(72) Inventor: Tyler Jacobs, Hawthorne, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 713 days.

(21) Appl. No.: 18/194,519

(22) Filed: Mar. 31, 2023

(65) Prior Publication Data

US 2024/0222800 A1 Jul. 4, 2024

Related U.S. Application Data

(60) Provisional application No. 63/436,388, filed on Dec. 30, 2022.

(51) Int. Cl.
*H01M 50/507* (2021.01)
*H01M 50/213* (2021.01)

(52) U.S. Cl.
CPC ....... *H01M 50/507* (2021.01); *H01M 50/213* (2021.01)

(58) Field of Classification Search
CPC .......................... H01M 50/213; H01M 50/507
See application file for complete search history.

(56) References Cited

U.S. PATENT DOCUMENTS

| | | | | |
|---|---|---|---|---|
| 3,546,023 | A | 12/1970 | Halter | |
| 9,147,875 | B1 | 9/2015 | Coakley | |
| 9,545,010 | B2 | 1/2017 | Coakley | |
| 9,793,530 | B2 | 10/2017 | Wintner | |
| 9,844,148 | B2 | 12/2017 | Coakley | |
| 10,211,443 | B2 | 2/2019 | Coakley | |
| 10,461,010 | B2 | 10/2019 | Yoshihara | |
| 10,784,543 | B2 | 9/2020 | Hasegawa | |
| 10,964,931 | B2 | 3/2021 | Coakley | |
| 11,116,070 | B2 | 9/2021 | Coakley | |
| 11,894,580 | B2 | 2/2024 | Coakley | |
| 11,979,976 | B2 | 5/2024 | Coakley et al. | |
| 12,035,459 | B2 | 7/2024 | Coakley | |
| 12,040,511 | B2 | 7/2024 | Coakley | |
| 2011/0223468 | A1* | 9/2011 | Ferber, Jr. | H01M 50/51 29/401.1 |
| 2013/0337291 | A1 | 12/2013 | Mayer | |

(Continued)

FOREIGN PATENT DOCUMENTS

| | | | |
|---|---|---|---|
| CN | 209282351 | U | 8/2019 |
| CN | 115943521 | A | 4/2023 |

(Continued)

*Primary Examiner* — Gregg Cantelmo
(74) *Attorney, Agent, or Firm* — Baker Hostetler

(57) ABSTRACT

A battery may include several battery cells connected by a current collector assembly. The current collector assembly includes several conductor layers designed to connect (e.g., electrically couple) some battery cells in series and some battery cells in parallel. Using multiple interconnect portions, each conductor layer is coupled (e.g., electrically and mechanically coupled) to terminals (e.g., positive terminals, negative terminals) of the battery cells. The interconnect portions may be offset or diagonal with respect to each other, thereby allowing the interconnect portions to cover and couple to the terminals.

11 Claims, 29 Drawing Sheets

(56) References Cited

U.S. PATENT DOCUMENTS

| | | | | |
|---|---|---|---|---|
| 2018/0212222 | A1 | 7/2018 | Barton | |
| 2021/0175588 | A1 | 6/2021 | Coakley | |
| 2021/0273298 | A1* | 9/2021 | Babinot | H01M 50/502 |
| 2022/0289055 | A1 | 9/2022 | Aktas | |
| 2022/0376319 | A1 | 11/2022 | Yoon | |
| 2022/0384880 | A1 | 12/2022 | Flannery | |
| 2023/0113884 | A1* | 4/2023 | Yang | H01M 50/213 429/120 |
| 2023/0126707 | A1* | 4/2023 | Lee | H01M 50/213 429/121 |
| 2023/0253646 | A1 | 8/2023 | Tushar | |
| 2023/0261300 | A1 | 8/2023 | Compton | |
| 2023/0411800 | A1 | 12/2023 | Jeon | |
| 2024/0128532 | A1 | 4/2024 | Pruett | |
| 2024/0194992 | A1 | 6/2024 | Buckhout | |
| 2025/0038346 | A1 | 1/2025 | Kirmani | |

FOREIGN PATENT DOCUMENTS

| | | | |
|---|---|---|---|
| FR | 3094842 | A1 | 10/2020 |
| WO | WO 2011/149075 | | 12/2011 |
| WO | WO 2019/043413 | A1 | 3/2019 |

* cited by examiner

CURRENT COLLECTOR ASSEMBLIES

CROSS-REFERENCE TO RELATED APPLICATION(S)

This application claims the benefit of priority to U.S. Provisional Application No. 63/436,388, filed on Dec. 30, 2022, titled "CURRENT COLLECTOR ASSEMBLIES AND CARRIERS FOR BATTERIES," the disclosure of which is incorporated herein by reference in its entirety.

INTRODUCTION

Batteries are often used as a source of power, including as a source of power for electric vehicles that include wheels that are driven by an electric motor that receives power from the battery.

BRIEF SUMMARY

This application is directed to batteries, and in particular, to current collector assemblies and carriers for battery cells. Current collector assemblies are used to couple (e.g., electrically couple) several battery cells in parallel as well as several battery cells in series.

In one or more implementations, a current collector assembly is described. The current collector assembly may include a first conductor layer disposed in a laminate material. The first conductor layer may include a first portion configured to electrically couple to a first battery cell and a second battery cell. The first conductor layer may further include a second portion configured to electrically couple to a third battery cell and a fourth battery cell. The first conductor layer may further include a first extension connected to the first portion and the second portion. In some embodiments, the first portion extends in a first direction, and the first extension extends in a second direction that is non-perpendicular with respect to the first direction.

In one or more implementations, a conductor layer is described. The conductor layer may include a first portion. The conductor layer may further include a second portion. The conductor layer may further include a first extension connected to the first portion and the second portion. The conductor layer may further include a third portion. The conductor layer may further include a second extension connected to the second portion and the third portion. The conductor layer may further include a fourth portion. The conductor layer may further include a third extension connected to the third portion and the fourth portion. In some embodiments, the first extension is non-parallel and non-perpendicular with respect to the first portion and the second portion, the second extension is non-parallel and non-perpendicular with respect to the second portion and the third portion, and the third extension is non-parallel and non-perpendicular with respect to the third portion and the fourth portion.

In one or more implementations, a battery is described. The battery may include a current collector assembly that covers a first set of battery cells and a second set of battery cells. The current collector assembly may include a first end. The current collector assembly may further include a second end opposite the first end. The current collector assembly may further include a first set of conductor layers and a second conductor layers. The first conductor layer and the second conductor can be disposed in a laminate material. In some embodiments, the first set of conductor layers is electrically coupled to first set of battery cells, and the second set of conductor layers is electrically coupled to second set of battery cells. The battery may further include a first bus bar connected at the first end to the first set of battery cells. The battery may further include a second bus bar connected at the first end to the second set of battery cells. The battery may further include a third bus bar connected at the second end to the first set of battery cells and the second set of battery cells.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Aspects of the subject technology described herein relate to current collector assemblies used with an electrical power supply such as a battery pack. As described in further detail hereinafter, a current collector assembly disclosed herein holds several conductor layers designed to couple (e.g., electrically couple) to battery cells of a battery pack, thus placing some battery cells electrically coupled in series and some battery cells electrically coupled in parallel.

Figure 1A:
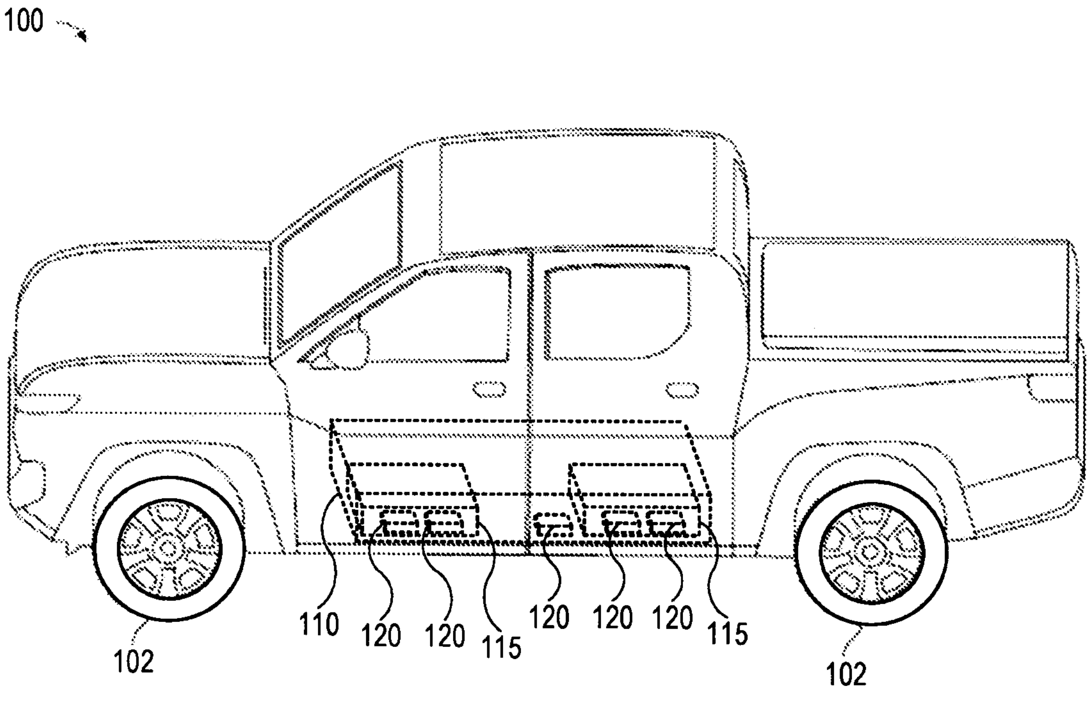
FIG. 1A and FIG. 1B illustrate schematic perspective side views of example implementations of a vehicle having a battery pack, in accordance with aspects of the present disclosure.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid). In various implementations, the vehicle 100 may be a fully autonomous vehicle that can navigate roadways without a human operator or driver, a partially autonomous vehicle that can navigate some roadways without a human operator or driver or that can navigate roadways with the supervision of a human operator, may be an unmanned vehicle that can navigate roadways or other pathways without any human occupants, or may be a human operated (non-autonomous) vehicle configured for a human operator.

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
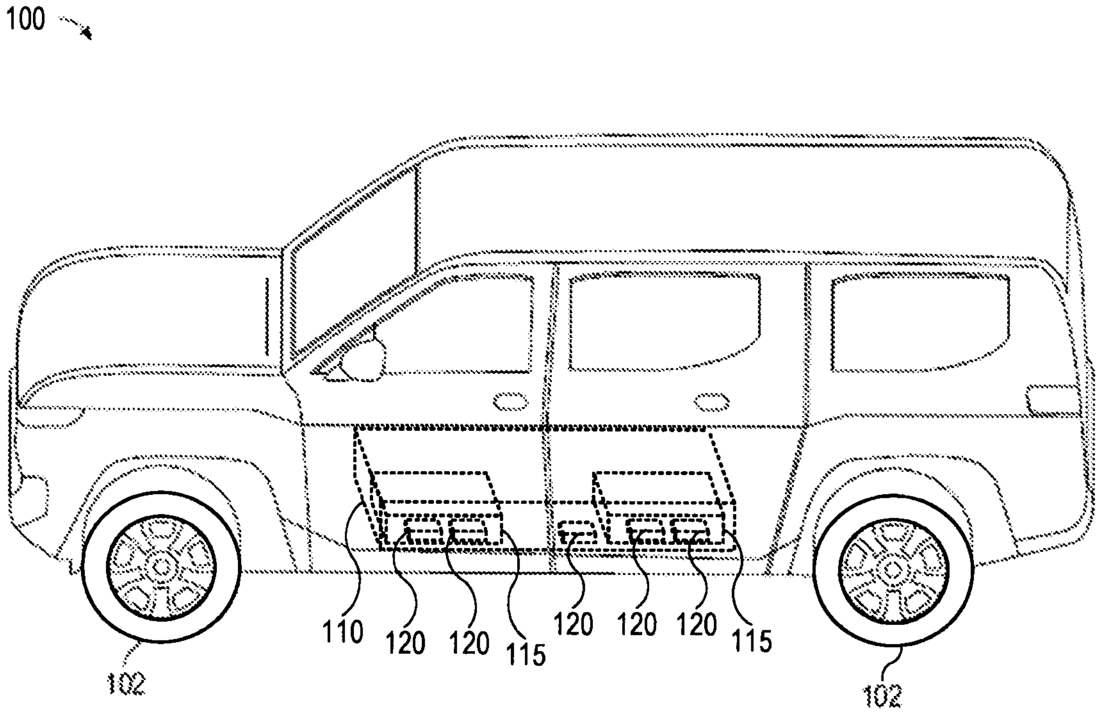

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
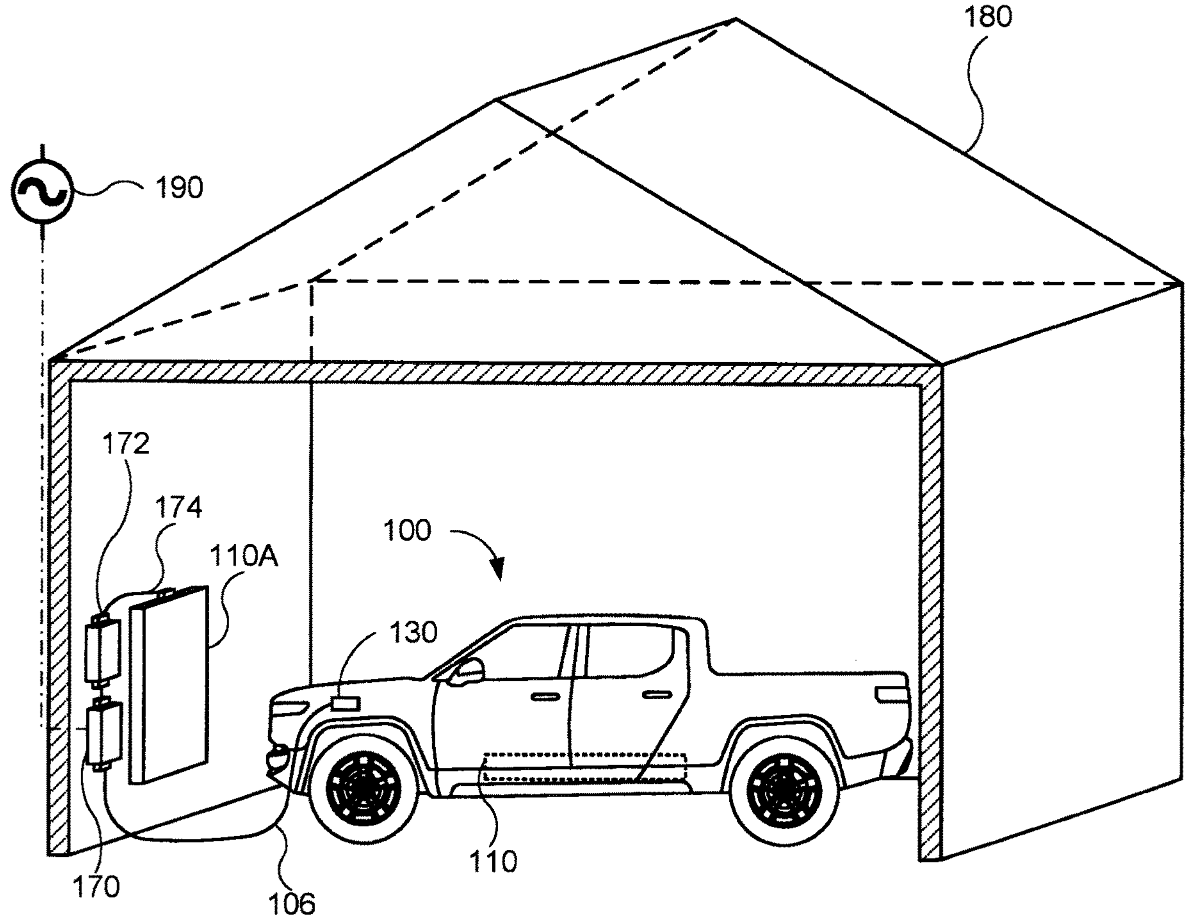
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
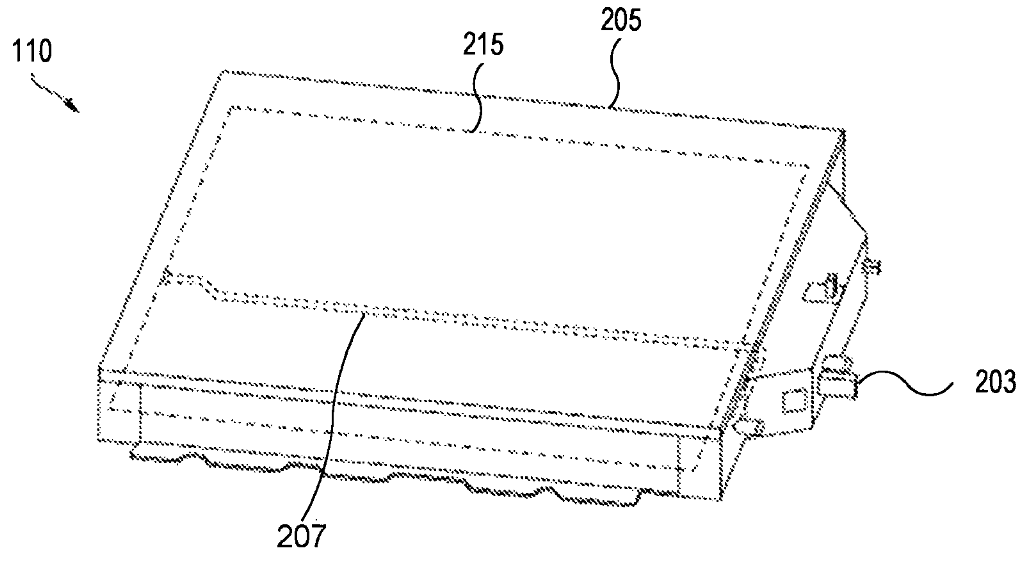
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 215 such as plates or bladders that are disposed in thermal contact with one or more battery modules 115 and/or battery cells 120 disposed within the battery pack frame 205. For example, a thermal component 215 may be positioned in contact with one or more battery modules 115, battery units, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
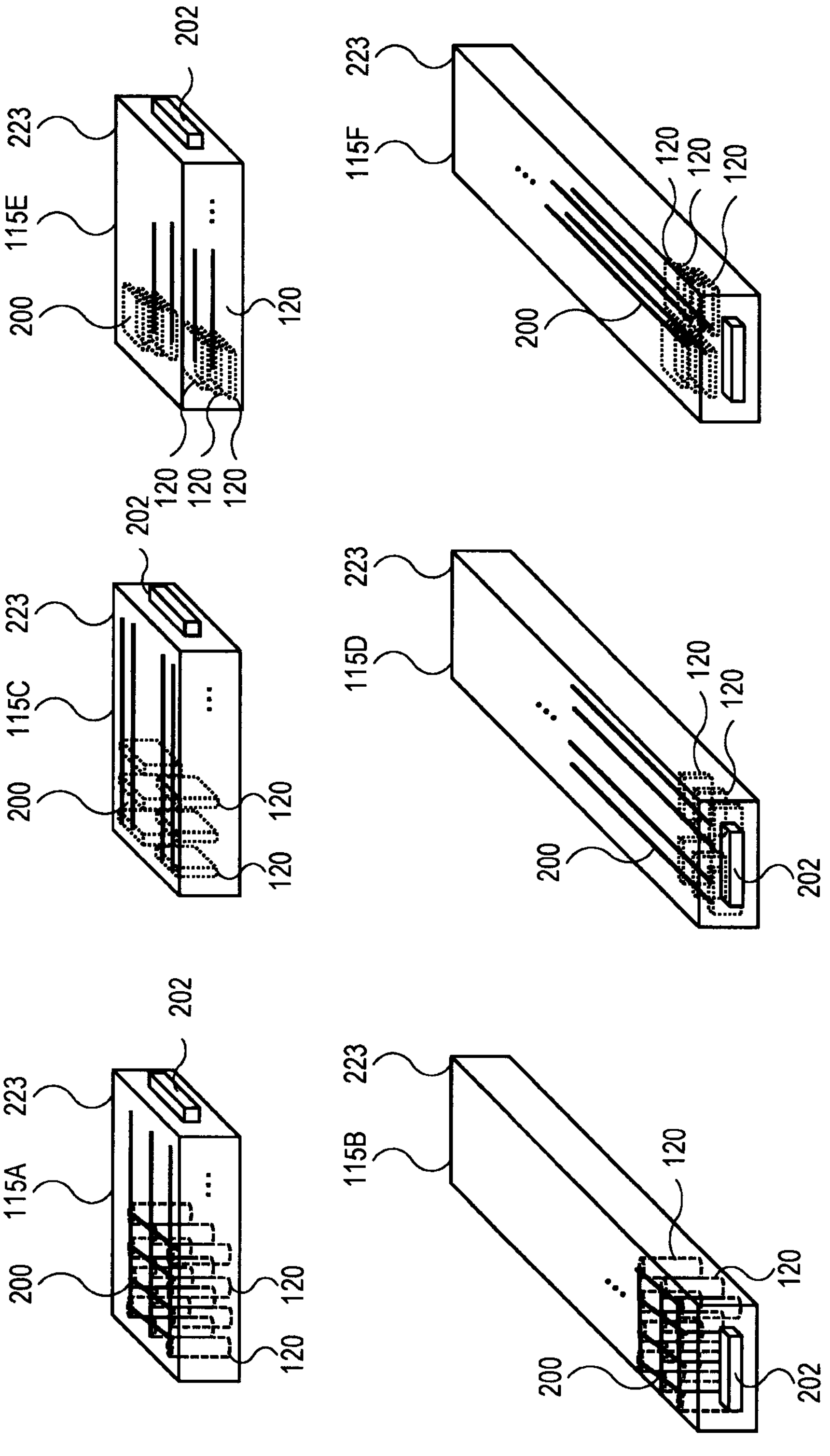
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
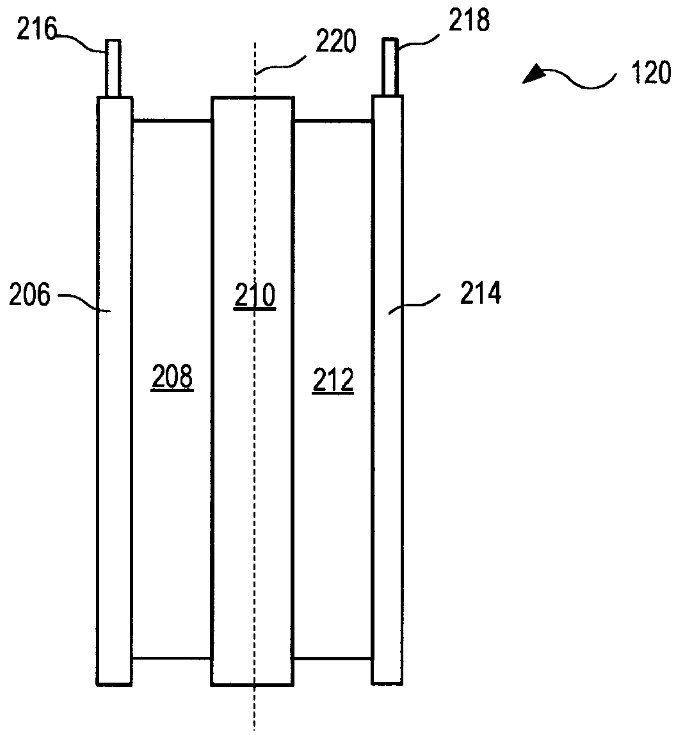
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
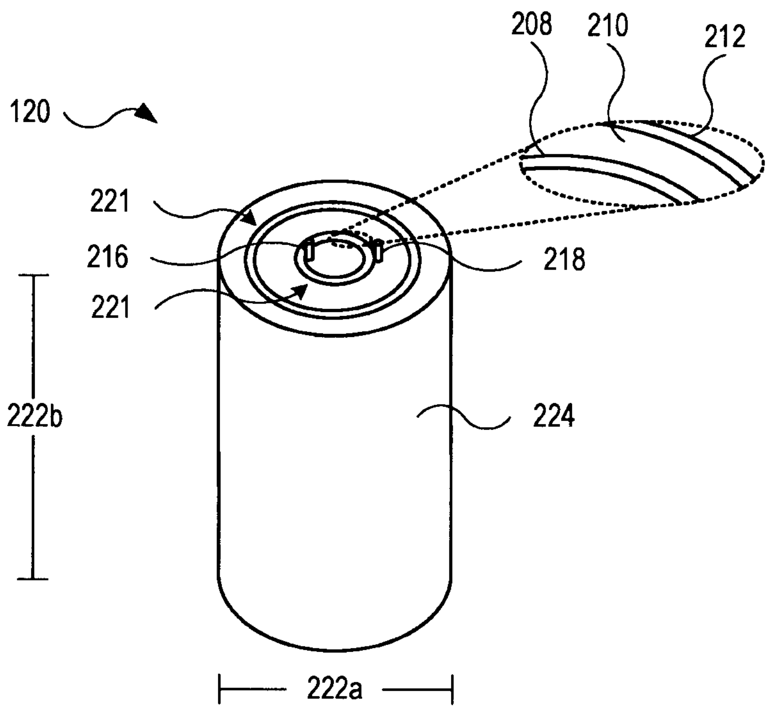
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell 120 may be implemented as a cylindrical cell. Accordingly, the battery cell 120 includes dimension 222*a* (e.g., cylinder diameter, battery cell diameter) and a dimension 222*b* (e.g., cylinder length). The battery cell 120, and other battery cells described herein, may include dimensional information derived from a 4-number code. For example, in some embodiments, the battery cell 120 includes an XXYY battery cell, in which "XX" refers to the dimension 222*a* in millimeters (mm) and "YY" refers to the dimension in mm. Accordingly, when the battery cell 120 includes a "2170" battery cell, the dimension 222*a* is 21 mm and the dimensions 222*b* is 70 mm. Alternatively, when the battery cell 520 includes a "4680" battery cell, the dimension 222*a* is 46 mm and the dimensions 222*b* is 80 mm. The foregoing examples of dimensional characteristics for the battery cell 120 should not be construed as limiting, and the battery cell 120, and other battery cells described herein with a cylindrical form factor, may include various dimension. For example, the dimension 222*a* and the dimension 222*b* may be greater than 46 mm and 80 mm, respectively.

In the example of FIG. 2D, the battery cell 120 includes a cell housing 224 having a cylindrical outer shape. As shown in the enlarged view, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220 shown in FIG. 2C) may be disposed within the cell housing 224. For example, a separator layer may be disposed between adjacent ones of the windings 221. Additionally, the battery cell in the cylindrical cell implementation of FIG. 2D includes a terminal 216 and a terminal 218. The terminal 218 may include a first polarity terminal, such as a positive terminal, that is coupled to the cathode 212. The terminal 216 may include a second polarity terminal, such as a negative terminal, that is coupled to the anode 208. The terminals 216 and 218 can be made from electrically conductive materials to carry electrical current from the battery cell 120 directly or indirectly (e.g., via a current carrier assembly, a bus bar, and/or other electrical coupling structures) to an electrical load, such as a component or system of a vehicle or a building shown and/or described herein. However, the cylindrical cell implementation of FIG. 2D is merely illustrative, and other implementations of the battery cells 120 are contemplated.

Figure 2E:
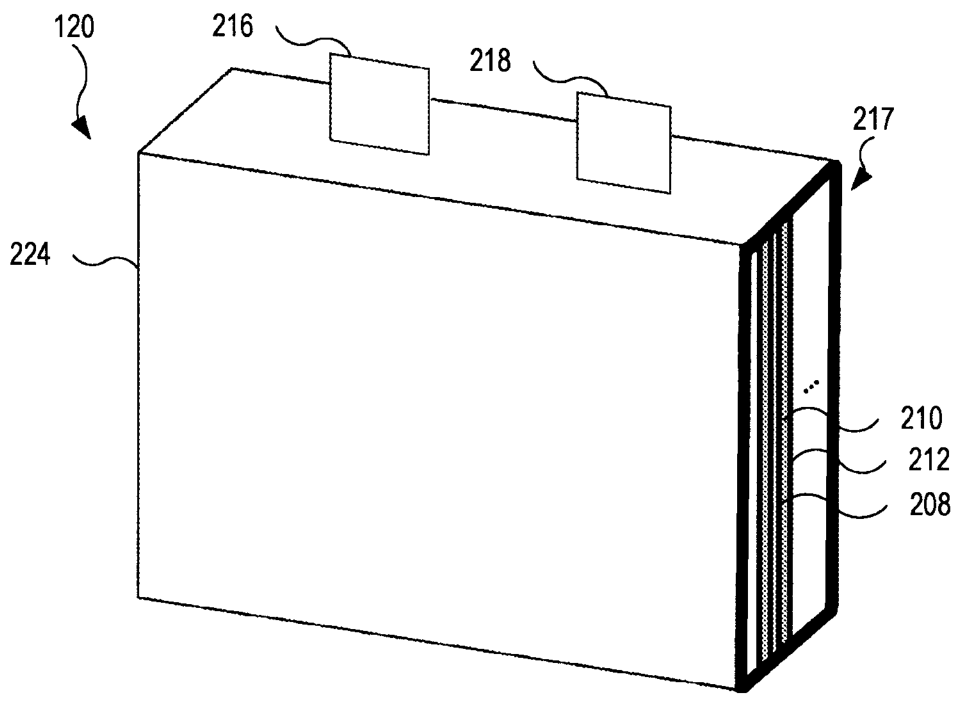
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 224 having a right prismatic outer shape. As shown, one or more layers of the anode 208, the cathode 212, and the electrolyte 210 disposed therebetween may be disposed (e.g., with separator materials between the layers) within the cell housing 224 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 224 having the right prismatic shape. In the implementation of FIG. 2E, the cell housing 224 has a relatively thick cross-sectional width 217 and is formed from a rigid material. For example, the cell housing 224 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 224 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 224 (e.g., a glass to metal feedthrough) as the conductor passes through to cell housing 224 to expose the first terminal 216 and the second terminal 218 outside the cell housing 224 (e.g., for contact with an interconnect structure 200 of FIG. 2B). However, this implementation of FIG. 2E is also illustrative and yet other implementations of the battery cell 120 are contemplated.

Figure 2F:
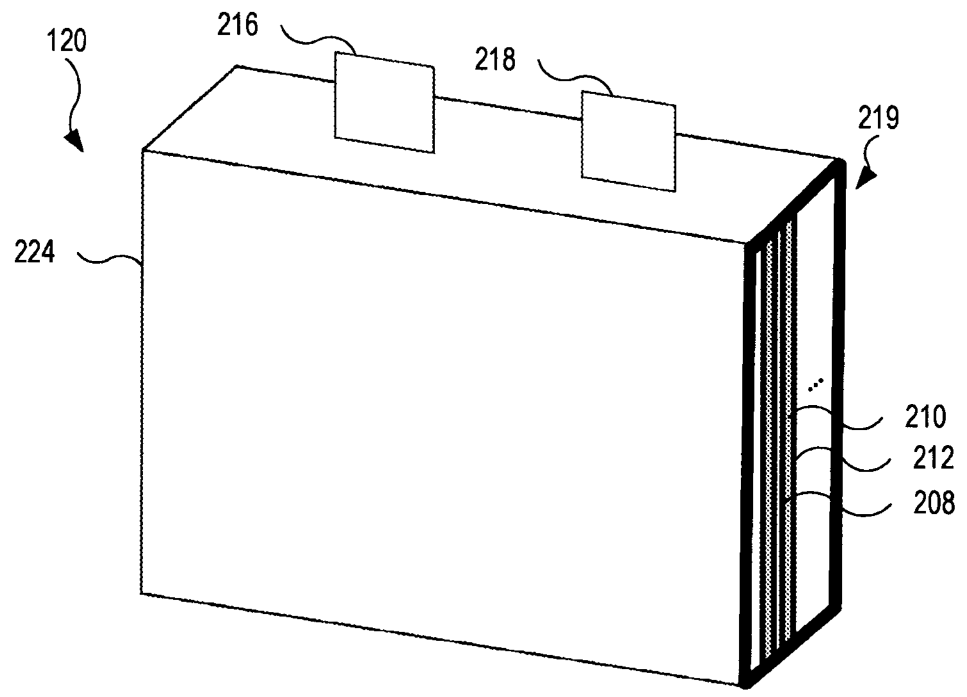
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 224 that forms a flexible or malleable pouch housing. In the implementation of FIG. 2F, the cell housing 224 has a relatively thin cross-sectional width 219. For example, the cell housing 224 in the implementation of FIG. 2F may be formed from a flexible or malleable material (e.g., a foil, such as a metal foil, or film, such as an aluminum-coated plastic film). For example, the cross-sectional width 219 of the cell housing 224 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 224 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 224 of the battery cell 120 can be disposed in the battery module 115, the battery pack 110, or installed in any of the vehicle 100, the building 180, or any other electrically powered component or device.

Figure 3:
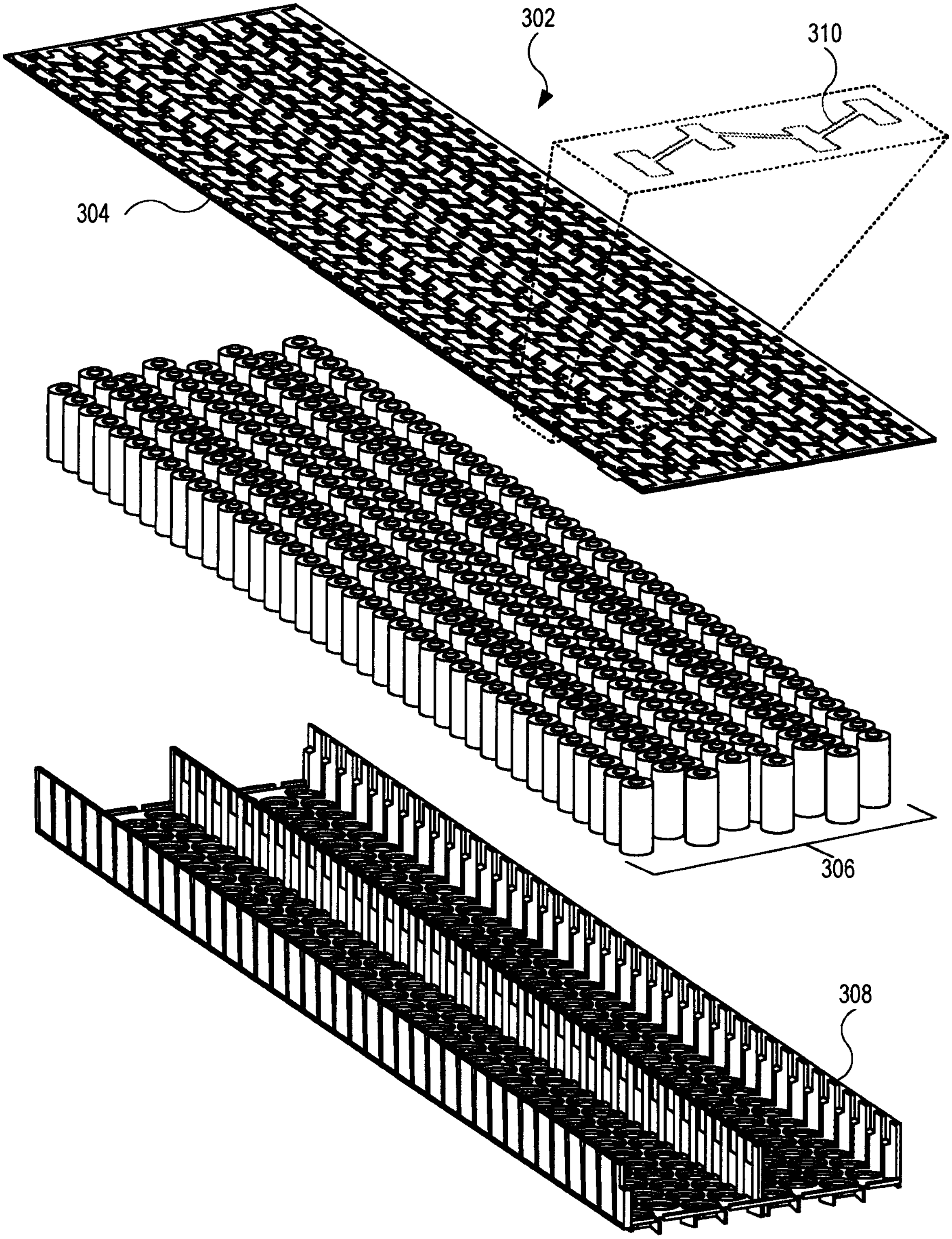
FIG. 3 illustrates an exploded view of a battery module, in accordance with aspects of the present disclosure.

FIG. 3 illustrates an exploded view of a battery module 302, in accordance with aspects of the present disclosure. The battery module 302 may be one of several battery modules used to form a battery pack. The battery module 302 may include a current collector assembly 304, battery cells 306, and a carrier 308. The current collector assembly 304 may include several conductor layers (e.g., electrically conductive layers) disposed a non-electrically conductive layer. For example, as shown in the enlarged view, the current collector assembly 304 includes a conductor layer 310, representative of several additional conductor layer in two columns of conductor layers in the current collector assembly 304. The conductor layers of the current collector assembly 304 are designed to couple or connect (e.g., electrically couple or connect, respectively) to multiple battery cells of the battery cells using fusible links. The current collector assembly 304 includes an area such that the current collector assembly 304 covers each battery cells of the battery cells 606. The carrier 308 is designed to carry and hold each of the battery cells 306.

As shown in FIG. 3, each of the battery cells includes a similar shape and design. In this regard, each of the battery cells 306 shown in FIG. 3 may include any features shown and described herein for the battery cell 120 (e.g., cylindrical battery cell) shown and descried in FIG. 2D. Also, although a discrete number of the battery cells 606 are shown, the battery cells 306 may include several hundred or several thousand battery cells. The current collector assembly 304 and the carrier 308 can scale (e.g., scale up or scale down) based on the number of the battery cells 306.

Figure 4:
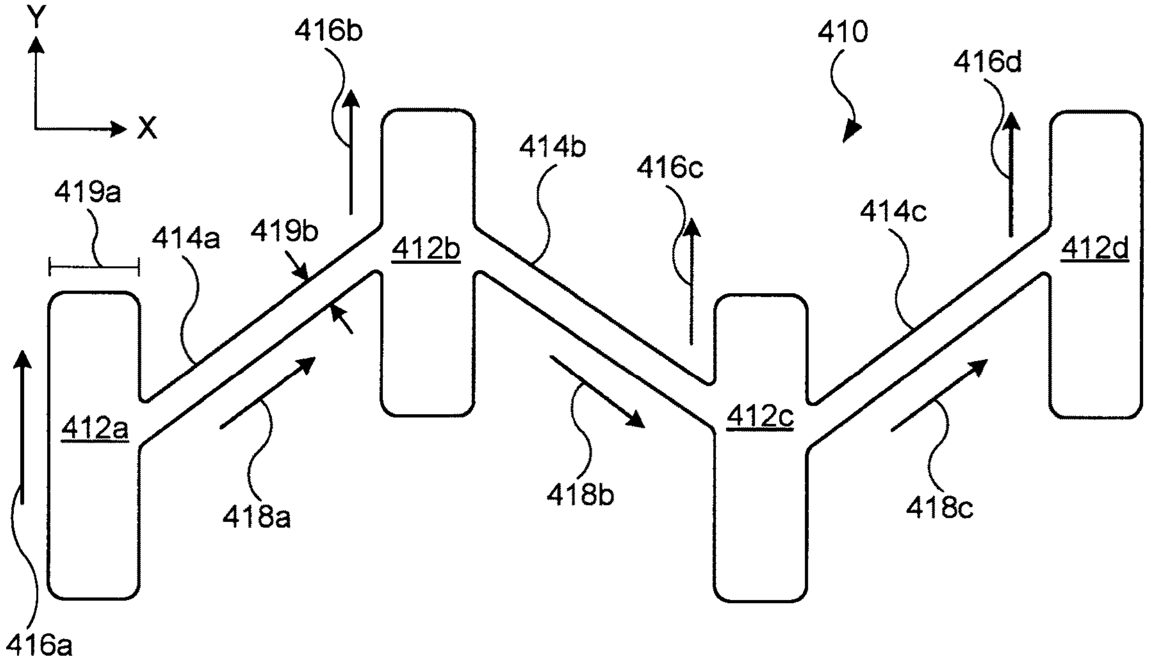
FIG. 4 illustrates an embodiment of a conductor layer, in accordance with aspects of the present disclosure.

FIG. 4 illustrates an embodiment of a conductor layer 410, in accordance with aspects of the present disclosure. The conductor layer 410 may include a continuous layer of material with various shapes connected together to form a continuous, electrically conductive layer. An element(s) that is/are "connected together" with another element(s) may refer to the elements being formed together from a single piece of material or alloy. However, in some implementations (not shown in FIG. 4), elements can be individual structures secured together by various means. Also, the conductor layer 410 may include one or more electrically conductive materials, such as Al or Cu, as non-limiting examples.

As shown, the conductor layer 410 includes a portion 412*a*, a portion 412*b*, a portion 412*c*, and a portion 412*d*. The portions 412*a*, 412*b*, 412*c*, and 412*d* represent locations in which the conductor layer 410 is connected to terminals of battery cells, including terminals of two separate battery cells. In this manner, the conductor layer 410, having four portions (e.g., portions 412*a*, 412*b*, 412*c*, and 412*d*) is designed to connect to eight battery cells. Each of the portions 412*a*, 412*b*, 412*c*, and 412*d* is rectangular, or at least substantially rectangular. However, other shapes are possible. Exemplary processes for connecting (e.g., electrically and mechanically connecting) portions 412*a*, 412*b*, 412*c*, and 412*d* to battery terminals include welding (e.g., laser welding, ultrasonic welding) or wire bonding a fusible link of a battery cell to the respective portion of the conductor layer 410. Based on the functionality of electrically and mechanically coupling to battery terminals, the portions 412*a*, 412*b*, 412*c*, and 412*d* may each be referred to as an interconnect (or interconnect portion), interconnector (or interconnector portion), a battery interconnect, or the like.

The conductor layer 410 further includes several extensions that coupled together the portions. For example, the conductor layer 410 includes an extension 414*a* connected to, and providing electrical pathway between, the portions 412*a* and 412*b*. The conductor layer 410 further includes an extension 414*b* connected to, and providing electrical pathway between, the portions 412*b* and 712*c*. The conductor layer 410 further includes an extension 414*c* connected to, and providing an electrical pathway between, the portions 412*c* and 412*d*. Unlike portions 412*a*, 412*b*, and 412*c*, extensions 414*a*, 414*b*, and 414*c* may not physically or mechanically connect to battery terminals.

The conductor layer 410 may include several dimensional relationships among the portions and the extensions. For example, the portion 412*a* may include an elongated structure with a major dimension extending in a direction 416*a*. As shown, the direction 416*a* is parallel with respect to a Y-axis (of Cartesian coordinates). A "major dimension" may refer to a dimension of greater/greatest length of a structure. Similarly, the portions 412*b*, 412*c*, and 412*d* may each include an elongated structure with a major dimension extending in a direction 416*b*, a direction 416*c*, and a direction 416*d*, respectively, with the directions 416*b*, 416*c*, and 416*d* being parallel, or at least substantially parallel, with respect to the direction 416*a*. When referring to directional information, the term "parallel" refers to two or more structures having the same distance continuously therebetween. Accordingly, the portions 412*b*, 412*c*, and 412*d*, including their respective major dimension, are each parallel with respect to the portion 412*a*, including a major dimension of the portion 412*a*.

Additionally, the extensions 414*a*, 414*b*, and 414*c* may extend in different directions. For example, the extension 414*a* includes a major dimension that extends in a direction 418*a*, with the direction 418*a* being non-parallel and non-perpendicular with respect to the direction 416*a*, as well as the directions 416*b*, 416*c*, and 416*c*. Accordingly, the extension 414*a* is non-parallel with respect to the portions 412*b*, 412*c*, and 412*d*. When referring to directional information, the term "non-parallel" refers to two or more structures having a varying distance such that their respective directions converge. Also, the extension 414*b* includes a major dimension that extends in a direction 418*b*, with the direction 418*b* being non-parallel and non-perpendicular with respect to the directions 416*a*, 416*c*, and 416*d*. Accordingly, the extension 414*b* is non-parallel with respect to the portions 412*a*, 412*c*, and 412*d*, respectively. Further, the extension 414*c* includes a major dimension that extends in a direction 418*c*, with the direction 418*c* being non-parallel with respect to the directions 416*a*, 416*b*, and 416*c*. Accordingly, the extension 414*c* is non-parallel with respect to the portions 412*a*, 412*b*, and 412*c*. In addition to being non-parallel, the extensions 414*a*, 414*b*, and 414*c* may also be non-perpendicular with respect to the portions 412*a*, 412*b*, 412*c*, and 412*d*. An element that is "non-perpendicular" with respect to another element refers to the elements collectively not forming a 90-degree angle. Further, the extensions 414*a*, 414*b*, and 414*c* may be characterized as being diagonal structures, thus placing the placing the portions 414*a*, 414*b*, 414*c*, and 414*d* in a diagonal, or offset, manner with respect to each other. Also, the extensions 414*a* and 414*c* are parallel, or at least substantially parallel, with respect to each other, and the extensions 414*a* and 414*c* are non-parallel with respect to the extension 414*b*.

Further, the portion 412*a* may include a dimension 419*a* (e.g., width) representing a minor dimension. A "minor dimension" may refer to a dimension of lesser/least length of a structure. As shown, the dimension 419*a* is parallel with respect to the X-axis (of Cartesian coordinates). Also, the extension 414*a* includes a dimension 419*b* (e.g., width) that is taken along a dimension perpendicular with respect to the direction 418*a*. As shown, the dimension 419*b* less than the dimension 419*a* (representing a minor dimension) of the portion 412*a*. Beneficially, the conductor layer 410 includes dimensional relationships designed to reduce the overall material makeup (of the conductor layer 410). Each of the portions 412*b*, 412*c*, and 412*d* may include a dimension similar to that of the dimension 419*a*, and each of the extensions 414*b* and 714*c*, may include a dimension similar to that of the dimension 419*b*.

Figure 5:
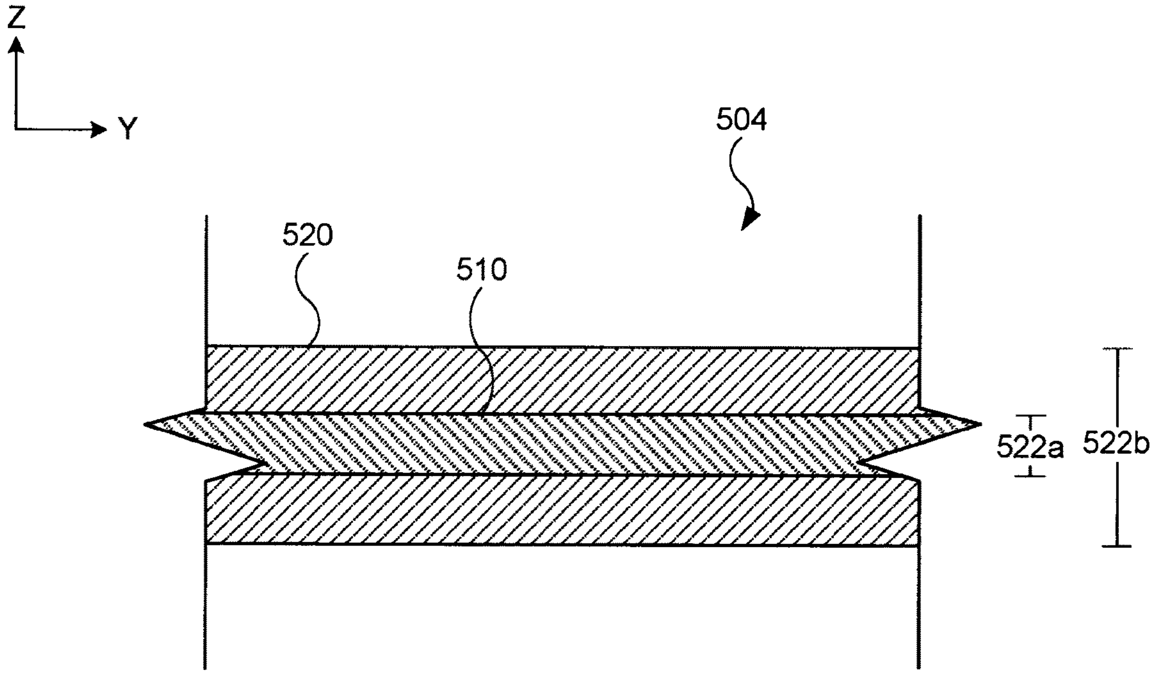
FIG. 5 illustrates a cross-sectional view of a current collector assembly and a conductor layer within the current collector assembly, in accordance with aspects of the present disclosure.

FIG. 5 illustrates a cross-sectional view of a current collector assembly 504 and a conductor layer 510 within the current collector assembly 504, in accordance with aspects of the present disclosure. The current collector assembly 504 may include a material 520. In some implementations, the material 520 may include a polymer-based material (e.g., laminate material) or some other non-electrically conductive material. In some embodiments, the material 520 is a laminate material. In this manner, the conductor layer 510 (representative of several additional conductor layers not shown in FIG. 5) can be disposed or otherwise positioned within the material 520 during, for example, a lamination operation.

The conductor layer 510 may include a dimension 522_a_ (e.g., thickness) approximately in the range of 130 to 170 micrometers (microns) and the material 520 may include a dimension 522_b_ (e.g., thickness) approximately in the range of 350 to 450 microns. The dimension 522_a_ and 522_b_ may represent a dimension (e.g., height) along a Z-direction (in Cartesian coordinates). In some embodiments, the dimension 522_a_ is 150 microns (or about 150 microns) and the dimension 522_b_ is 400 microns (or about 400 microns). The dimension 522_b_ may also represent the dimension of the current collector assembly 504.

Figure 6:
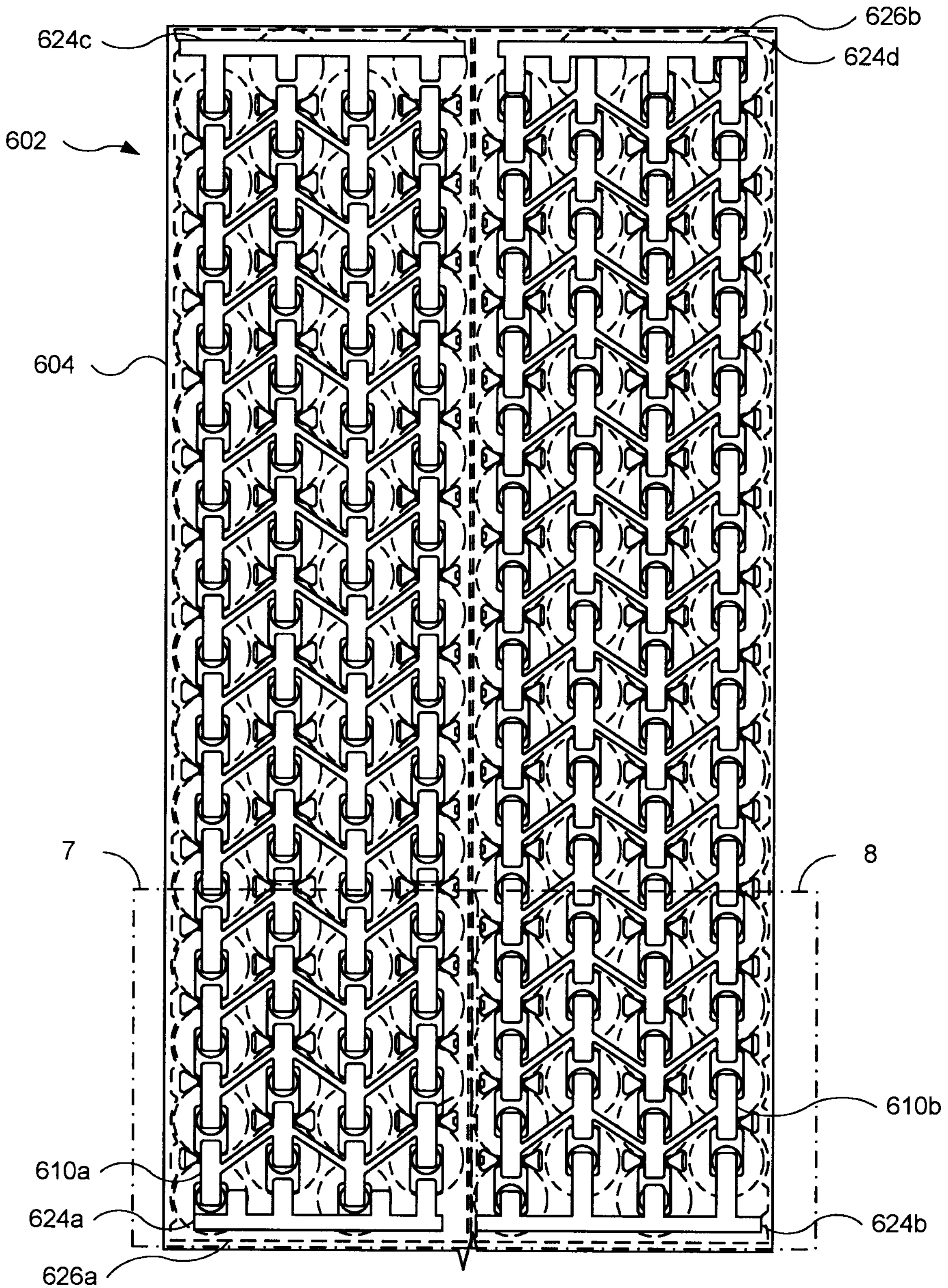
FIG. 6 illustrates a plan view of a battery module, in accordance with aspects of the present disclosure.

FIG. 6 illustrates a plan view of a battery module 602, in accordance with aspects of the present disclosure. The battery module 602 includes a current collector assembly 604, which includes an area designed to cover battery cells of a battery modules. The current collector assembly 604 may include several conductor layers, including a conductor layer 610_a_ and a conductor layer 610_b_, disposed in a material (e.g., laminate material, not labeled) and coupled (e.g., electrically coupled) to several battery cells. In addition to conductor layers, additional features may be used to connect to battery cells. For example, a bus bar 624_a_ and a bus bar 624_b_ are electrically coupled to battery cells at an end 626_a_ of the current collector assembly 604, while a bus bar 624_c_ and a bus bar 624_d_ are electrically coupled to battery cells at an end 626_b_ of the current collector assembly 604, with the end 626_b_ being opposite the end 626_a_. Based on electrically couplings between respective battery cells and the bus bars 624_a_, 624_b_, 624_c_, and 624_d_, as well as between the battery cells and the current collector assembly 64, the bus bars 624_a_, 624_b_, 624_c_, and 624_d_ are designed to collect current, based in part on the current collector assembly 604, from the battery cells.

Each of the bus bars 624_a_, 624_b_, 624_c_, and 624_d_ may include an electrically conductive material, such as steel (as a non-limiting example). Although not shown, each of the bus bars 624_a_, 624_b_, 624_c_, and 624_d_ can connect to other components, including additional battery modules, a battery management system, and/or a battery voltage temperate circuit, as non-limiting examples. Also, in some embodiments, the bus bars 624_a_, 624_b_, 624_c_, and 624_d_ are separate from the current collector assembly 604. Alternatively, in some embodiments, the bus bars 624_a_, 624_b_, 624_c_, and 624_d_ disposed in the current collector assembly 604. For example, similar to the conductor layers 610_a_ and 610_b_, the bus bars 624_a_, 624_b_, 624_c_, and 624_d_ may be laminated in the current collector assembly 604 by a lamination operation.

Figure 7:
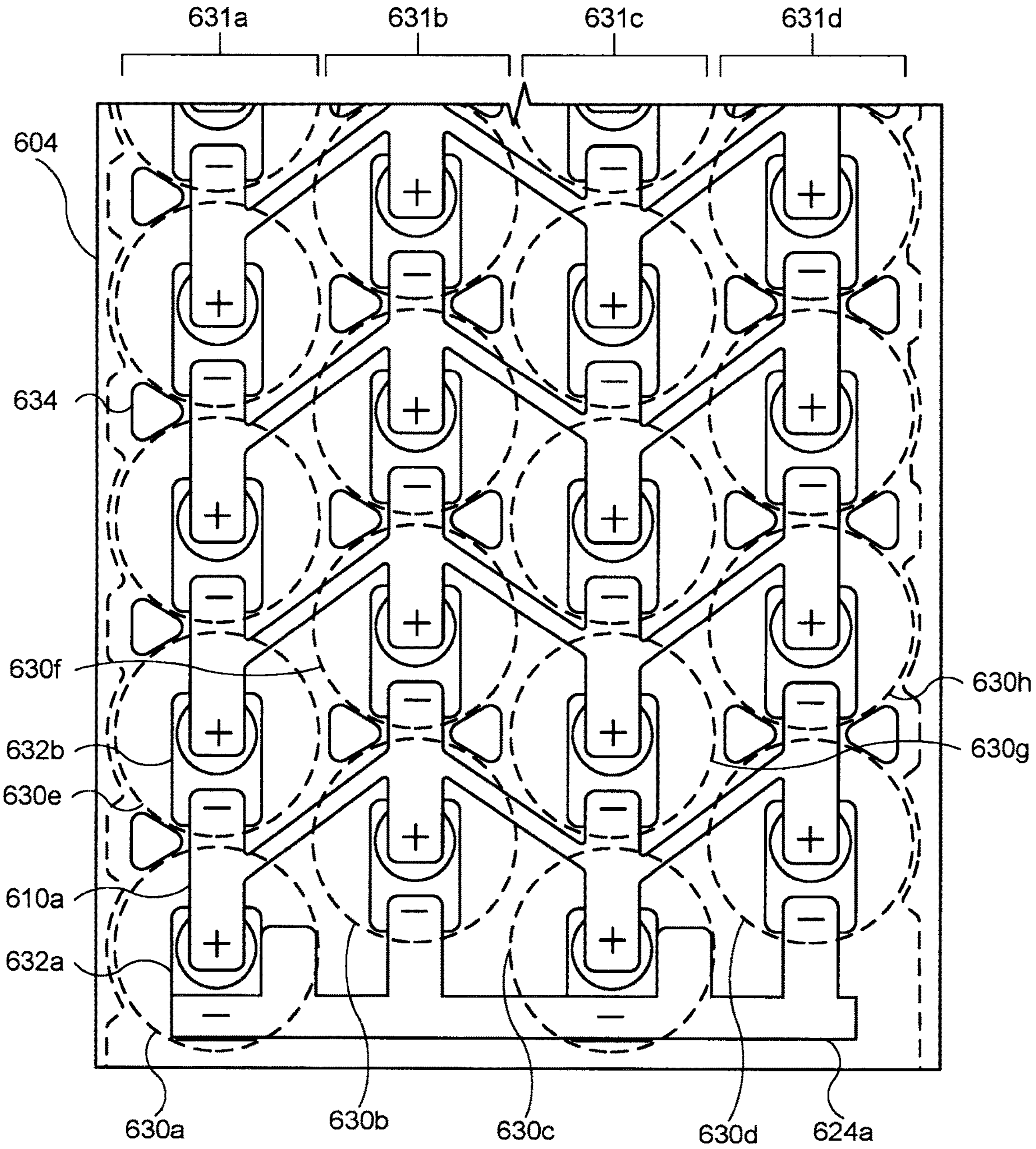
FIG. 7 and FIG. 8 illustrate enlarged plan views of the battery module shown in FIG. 6, showing additional features, in accordance with aspects of the present disclosure.
Figure 8:
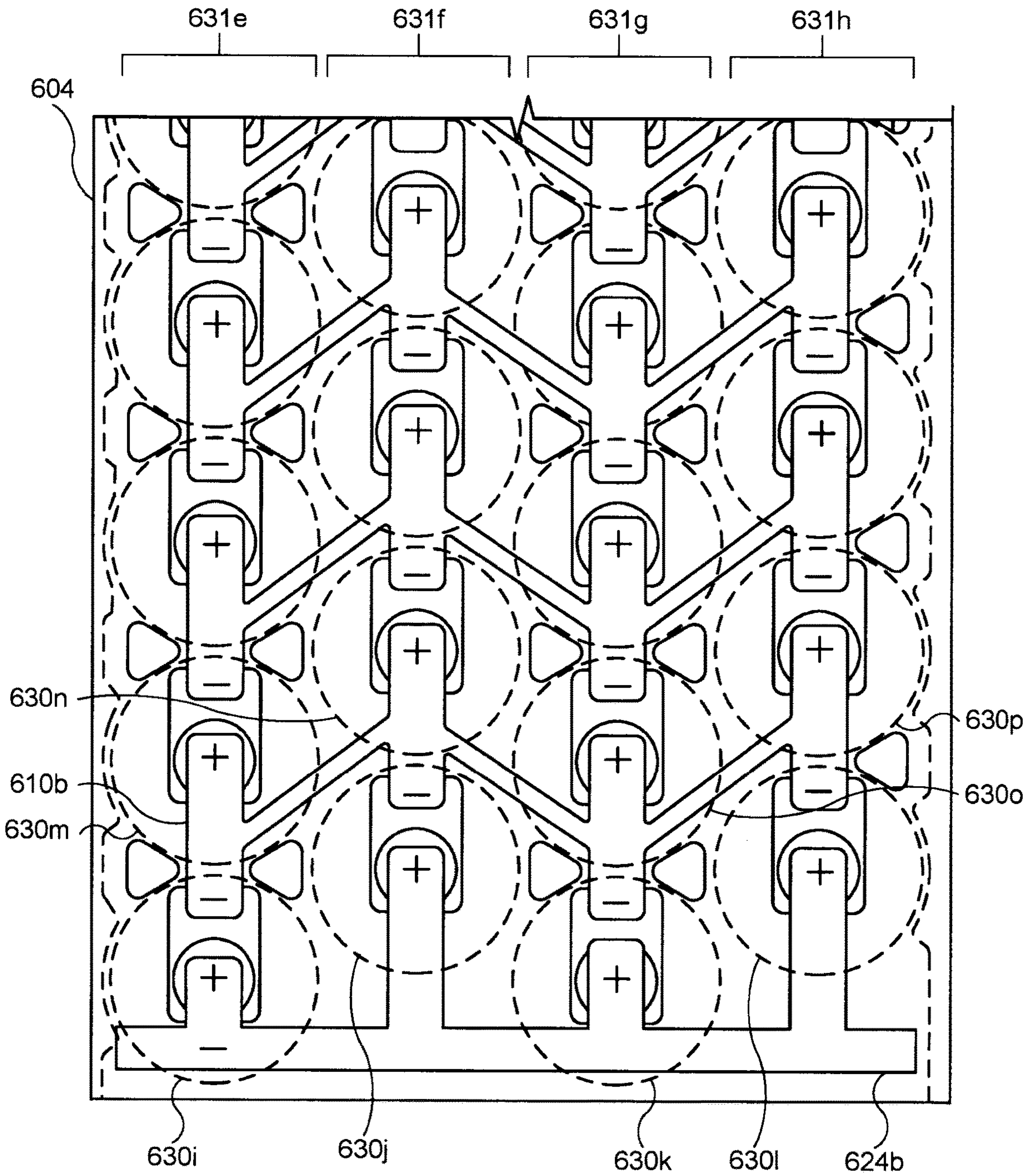

FIGS. 7 and 8 illustrate enlarged plan views of the battery module 602 shown in FIG. 6, showing additional features, in accordance with aspects of the present disclosure. FIG. 7 shows an enlarged view of section 7 (shown in FIG. 6) of the current collector assembly 604. The current collector assembly 604 may include several conductor layers, such as a conductor layer 610_a_. The conductor layer 610_a_ is connected to several battery cells. For example, the conductor layer 610_a_ is electrically coupled to a battery cell 630_a_, a battery cells 630_b_, a battery cell 630_c_, and a battery cell 630_d_, with the battery cells 630_a_, 630_b_, 630_c_ and 630_d_ being in separate columns. Batteries cells shown in FIG. 7 are depicted by dotted lines. Moreover, the conductor layer 610_a_ is electrically coupled to respective positive terminals, denoted by a plus ("+") sign, of the battery cells 630_a_, 630_b_, 630_c_ and 630_d_.

Additionally, the conductor layer 610_a_ is electrically coupled to a battery cell 630_e_, a battery cells 630_f_, a battery cell 630_g_, and a battery cell 630_h_. Moreover, the conductor layer 610_a_ is connected to respective negative terminals, denoted by a minus ("−") sign, of the battery cells 630_c_, 630_f_, 630_g_ and 630_h_. In this manner, the conductor layer 610_a_, representative of additional conductor layers, can connect (e.g., electrically couple) to eight battery cells.

Also, each of the battery cells 630_a_, 630_b_, 630_c_ and 630_d_ are in separate columns. For example, the battery cell 630_a_ is in a column 631_a_, the battery cell 630_b_ is in a column 631_b_, the battery cell 630_c_ is in a column 631_c_, and the battery cell 630_d_ is in a column 631_d_. The battery cells 630_a_, 630_b_, 630_c_ and 630_d_ may be characterized as being offset or diagonal with respect to each other. Further, each of the battery cells 630_e_, 630_f_, 630_g_ and 630_h_ are in separate columns. For example, the battery cell 630_e_ is in the column 631_a_, the battery cell 630_f_ is in the column 631_b_, the battery cell 630_g_ is in the column 631_c_, and the battery cell 630_h_ is in the column 631_d_. The battery cells 630_e_, 630_f_, 630_g_ and 630_h_ may be characterized as being offset or diagonal with respect to each other.

Further, based on the connections, the conductor layer 610_a_ electrically couples the battery cells 630_a_, 630_b_, 630_c_ and 630_d_ in parallel, and also electrically couples the battery cells 630_c_, 630_f_, 630_g_ and 630_h_ in parallel. A connection "in parallel" refers to an electrical coupling or connection in which terminals of the same polarity (e.g., positive or negative) are connected together. For example, based on electrically coupling the respective positive terminals of the battery cells 630_a_, 630_b_, 630_c_, and 630_d_ together, the conductor layer 610_a_ electrically couples the battery cells 630_a_, 630_b_, 630_c_, and 630_d_ together in parallel. Additionally, based on electrically coupling the respective negative terminals of the battery cells 630_c_, 630_f_, 630_g_, and 630_h_ together, the conductor layer 610_a_ electrically couples the battery cells 630_c_, 630_f_, 630_g_, and 630_h_ together in parallel. By placing battery cells in parallel, the total current output of the battery cells is sum of the current output of each battery cell. Similar conductor layers shown in FIG. 7 can also electrically couple four battery cells in parallel.

Based on additional connections, the conductor layer 610_a_ can connect several battery cells together in series. A connection "in series" refers to an electrical connection in which terminals of different polarity (e.g., positive to negative, negative to positive) are connected together. For example, the conductor layer 610_a_ electrically couples the battery cells 630_a_ and 630_e_ in series, the battery cells 630_b_ and 630_f_ in series, the battery cells 630_c_ and 630_g_ in series, and the battery cells 630_d_ and 630_h_ in series. By placing battery cells in series, the total voltage output of the battery cells is sum of the voltage output of each battery cell. Also, the battery cells 630_a_ and 630_e_ are in the same column (i.e., column 631_a_), the battery cells 630_b_ and 630_f_ are in the same column (i.e., column 631_b_), the battery cells 630_c_ and 630_g_ are in the same column (i.e., column 631_c_), and the battery cells 630_d_ and 630_h_ are in the same column (i.e., column 631_d_). Based on the additional conductor layers of the current collector assembly 604, each battery cell in a column, corresponding to a longitudinal dimension or major dimension of the current collector assembly 604, can be electrically coupled in series.

Also, the bus bar 624_a_ is electrically coupled to respective negative terminals of the battery cells 630_a_, 630_b_, 630_c_ and 630*d*. Accordingly, the bus bar 624*a* may include a shape that conforms to the position or location of respective negative terminals of the battery cells 630*a*, 630*b*, 630*c* and 630*d*.

In order to make electrical connections between a conductor layer and battery cells, the current collector assembly 604 includes several openings. For examples, the current collector assembly 604 includes an opening 632*a* and an opening 632*b* (representative of additional openings), which may include a void or through hole formed in a material (e.g., laminate material) of the current collector assembly 604. The openings 632*a* and 632*b* permit the conductor layer 610*a* to connect to respective terminals of the battery cells 630*a* and 630*e*, with the opening 632*a* further allowing the bus bar 624*a* to make a connection with the battery cell 630*a*.

Additionally, the current collector assembly 604 includes an opening 634 (representative of additional openings). The opening 634 includes a size and shape such that the opening 634 does not cover battery cells (e.g., battery cells 630*a* and 630*b*). In this manner, a material (e.g., potting material) used to provide ingress protection and/or management of a thermal event can be poured through the current collector assembly 604 via the opening 634 (as well as additional openings) without first contacting the battery cells.

FIG. 8 shows an enlarged view of section 8 (shown in FIG. 6) of the current collector assembly 604. The current collector assembly 604 may include several additional conductor layers, such as a conductor layer 610*b*. Similar to the conductor layer 610*a* (shown in FIG. 7), the conductor layer 610*b* can electrically couple to several battery cells.

As shown, the conductor layer 610*b* is electrically coupled to respective negative terminals of a battery cell 930*i*, a battery cells 630*j*, a battery cell 630*k*, and a battery cell 630*l*, with the battery cells 630*i*, 630*j*, 630*k* and 630*l* located in a column 631*e*, a column 631*f*, a column 631*g*, and a column 631*h*, respectively. Additionally, the conductor layer 610*b* is electrically coupled to respective positive terminals of a battery cell 630*m*, a battery cells 630*n*, a battery cell 630*o*, and a battery cell 630*p*, with the battery cells 630*m*, 630*n*, 630*o* and 630*p* located in the column 631*e*, the column 631*f*, the column 631 the, and the column 631*h*, respectively.

Based on the connections, the conductor layer 610*b* electrically couples the battery cells 630*i*, 630*j*, 630*k* and 630*l* in parallel, and also electrically couples the battery cells 630*m*, 630*n*. 630*o* and 630*p* in parallel. Similar conductor layers shown in FIG. 8 can also electrically couple four battery cells in parallel. Additionally, the conductor layer 610*b* electrically couples the battery cells 630*i* and 630*m* in series, the battery cells 630*j* and 630*n* in series, the battery cells 630*k* and 630*o* in series, and the battery cells 630*l* and 630*p* in series. As shown, the battery cells 630*i* and 630*m* are in the same column (i.e., column 631*e*), the battery cells 630*j* and 630*n* are in the same column (i.e., column 631*f*), the battery cells 630*k* and 630*o* are in the same column (i.e., column 631*g*), and the battery cells 630*l* and 630*p* are in the same column (i.e., column 631*h*). Based on the additional conductor layers of the current collector assembly 604, each battery cell in a column, corresponding to a longitudinal dimension or major dimension of the current collector assembly 604, can be electrically coupled in series. Also, although not expressly stated, the region of the current collector assembly 604 shown in FIG. 8 may include various openings for similar purposes to those shown in FIG. 7.

Additionally, the bus bar 624*b* is electrically coupled to respective positive terminals of the battery cells 630*i*, 630*j*, 630*k* and 630*l*. Accordingly, the bus bar 624*b* may include a shape that conforms to the position or location of respective positive terminals of the battery cells 630*i*, 630*j*, 630*k* and 630*l*. Also, although not expressly shown, the bus bars 624*c* and 624*d* (shown in FIG. 6) may include similar electrical connections to respective terminals as shown for the bus bars 624*a* and 624*b*.

Figure 9:
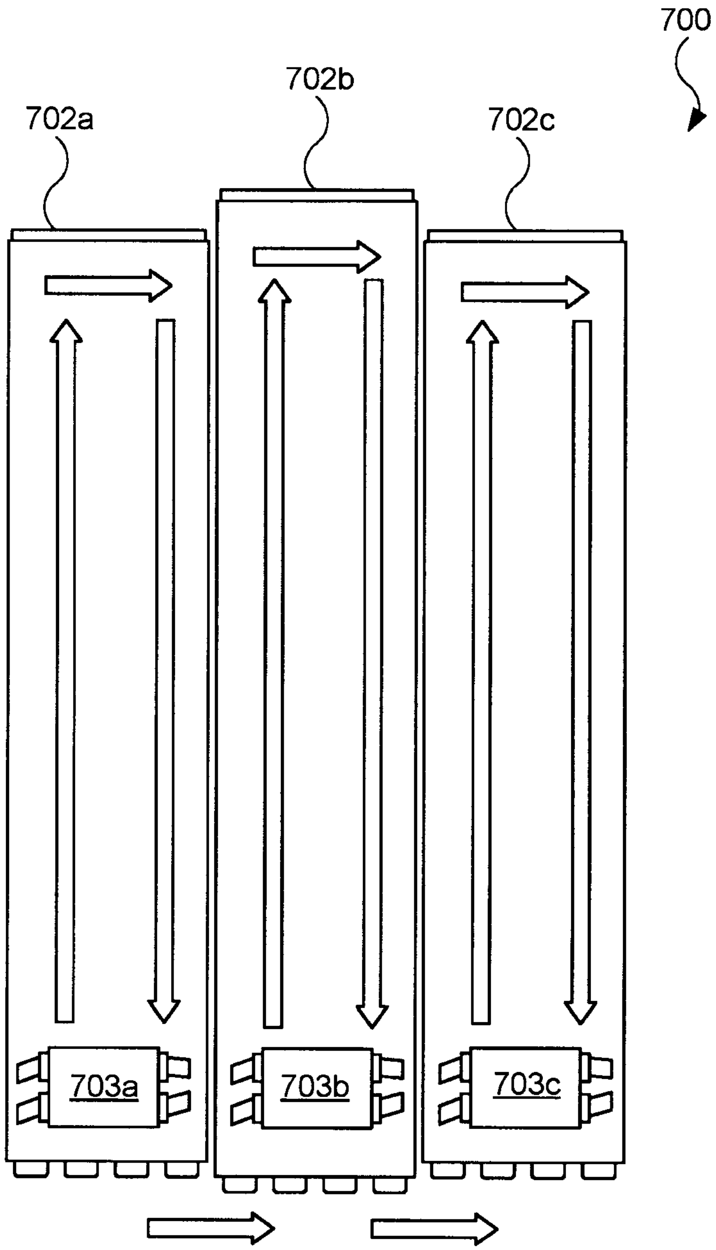
FIG. 9 illustrates a schematic diagram of battery modules of a battery pack connected together, in accordance with aspects of the present disclosure.

FIG. 9 illustrates a schematic diagram of battery modules of a battery pack 700 (or simply, battery) connected together, in accordance with aspects of the present disclosure. The battery pack 700 includes a battery module 702*a*, a battery module 702*b*, and a battery module 702*c*. Each of the battery modules 702*a*, 702*b*, and 702*c* may include control circuitry. For example, the battery modules 702*a*, 702*b*, and 702*c* may include control circuitry 703*a*, 703*b*, and 703*c*, respectively, that monitor parameters such as voltage and temperature.

Several arrows are superimposed on the battery modules 702*a*, 702*b*, and 702*c* represent an exemplary path of electrical current flow through each of the battery modules 702*a*. 702*b*, and 702*c*. Also, when the battery modules 702*a*, 702*b*, and 702*c* are electrically coupled together (e.g., electrically coupled together in series) additional arrows external to the battery modules 702*a*, 702*b*, and 702*c* represent a path of electrical current from the battery module 702*a* to the battery module 702*b*, and from the battery module 702*b* to the battery module 702*c*. Beneficially, by connecting the battery modules 702*a*, 702*b*, and 702*c* together in series, several respective battery cells (not shown in FIG. 9) of the battery modules 702*a*, 702*b*, and 702*c* are connected in series and the battery pack 700 can provide additional voltage. For example, in some embodiments, the battery pack 700 provides 500 or more Volts (V), including 900 or more V.

Also, as shown in FIG. 9, at least some of the battery modules may differ in size. For example, the battery module 702*b* is larger than each of the battery modules 702*a* and 702*c*. As a result, the battery module 702*b* may hold more battery cells than each of the battery modules 702*a* and 702*b*. However, in some implementations, each of the battery modules 702*a*, 702*b*, and 702*c* includes the same size and includes the same number of battery cells.

Figure 10:
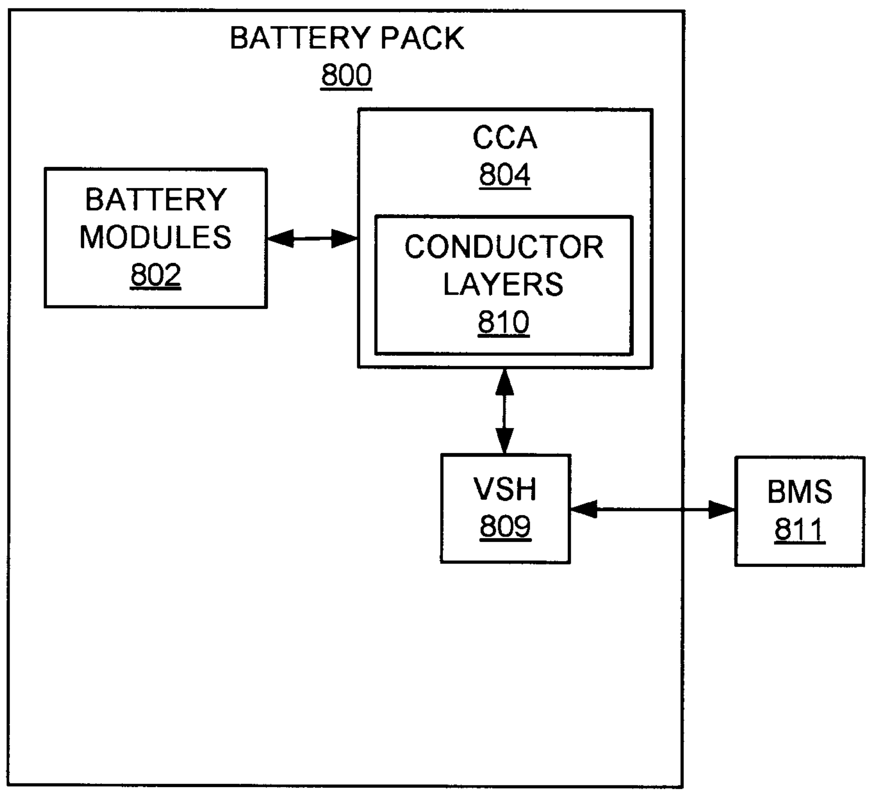
FIG. 10 illustrates a block diagram of a battery pack, in accordance with aspects of the present disclosure.

FIG. 10 illustrates a block diagram of a battery pack 800, in accordance with aspects of the present disclosure. The battery pack 800 may include one or more battery modules 802. The battery pack 800 may further include a current collector assembly 804 (CCA) that includes several conductor layers 810 designed to electrically couple respective battery cells together (e.g., in series and in parallel). The battery pack 800 may further include a voltage sense harness 809 (VSH) electrically coupled to the conductor layers 810. The voltage sense harness 809 is designed to relay voltage information to a battery management system 811 (BMS). For example, the voltage sense harness 809 can provide, to the battery management system 811, voltage information related to the battery cells electrically coupled (by the conductor layers 810) in parallel. Using information from the voltage sense harness 809, the battery management system 811 can, among various tasks, determine whether the battery cells are providing a predetermined voltage and current (or predetermined range of voltage and current, respectively) and provide adjustments to enable the battery cells to provide the predetermined voltage and current. As shown, the battery management system 811 is separate from the battery pack 800. However, the battery management system 811 may be incorporated onto the battery pack 800.

Figure 11:
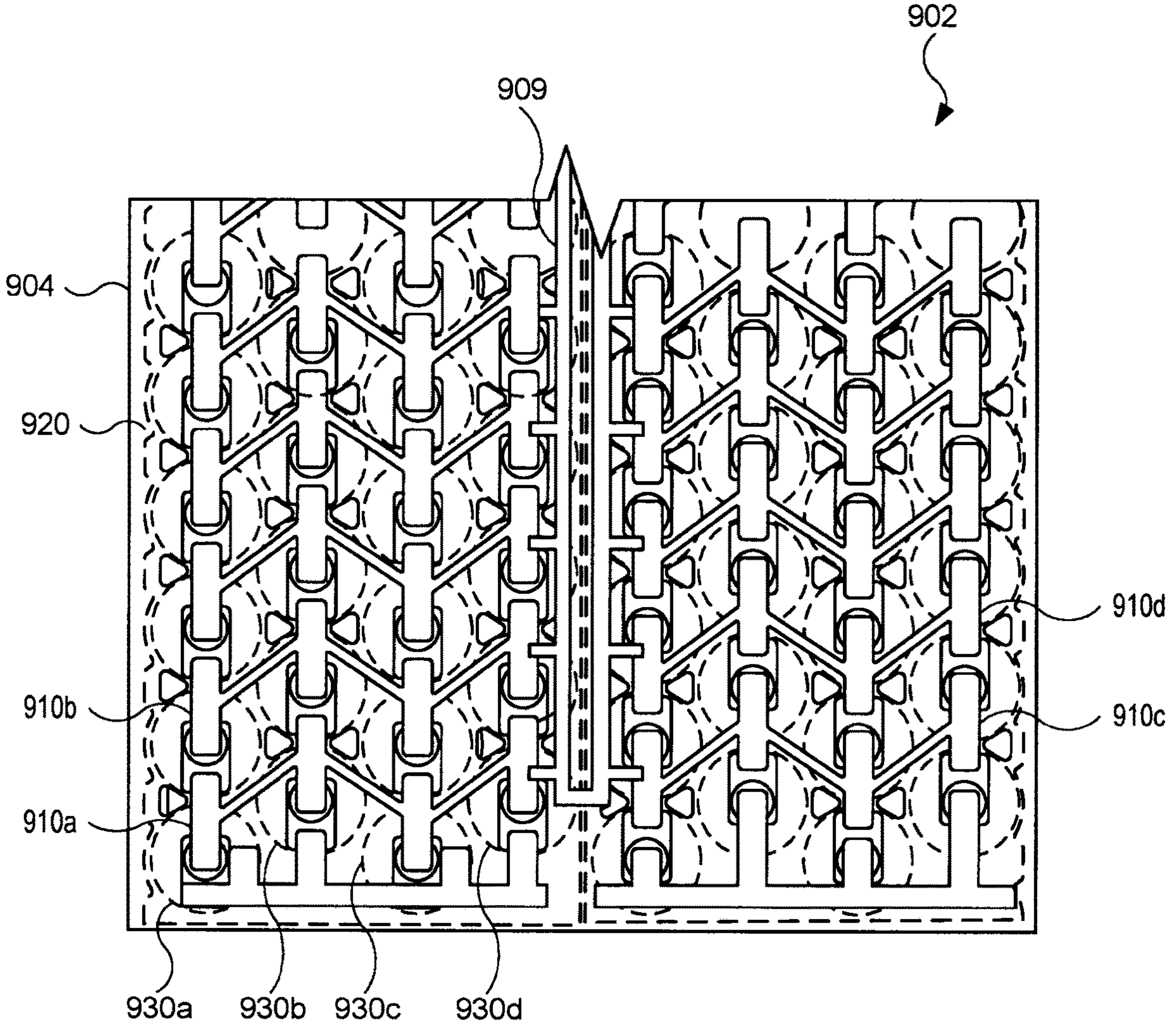
FIG. 11 illustrates a partial plan view of a battery module, showing a voltage sense harness, in accordance with aspects of the present disclosure.
Figure 12:
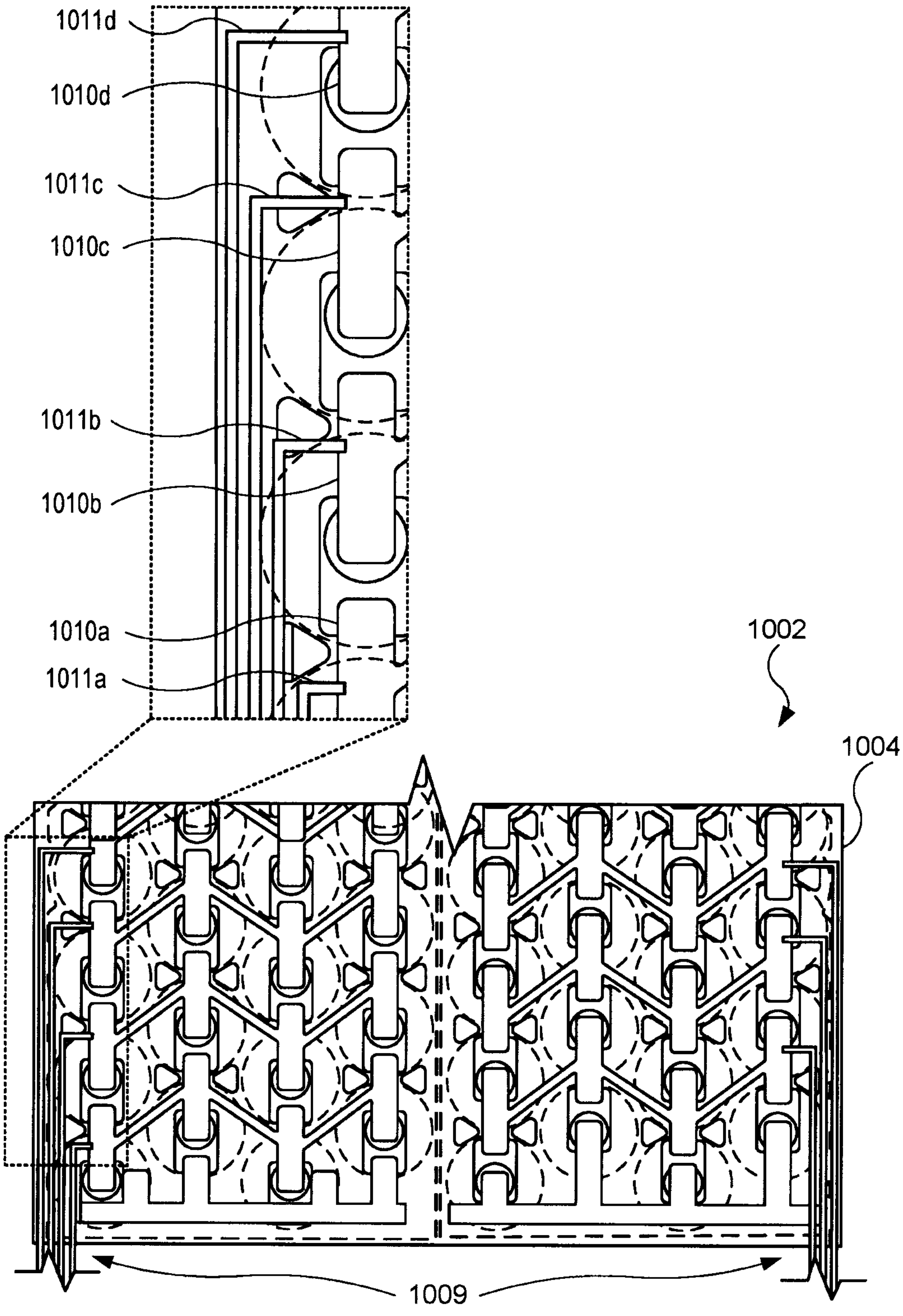
FIG. 12 illustrates a partial plan view of a battery module, showing an alternate voltage sense harness, in accordance with aspects of the present disclosure.

FIGS. 11 and 12 illustrate different implementations of a voltage sense harness. The voltage sense harnesses shown and described in FIGS. 11 and 12 may be implemented with other battery modules and current collector assemblies shown and described herein.

FIG. 11 illustrates a partial plan view of a battery module 902, showing a voltage sense harness 909, in accordance with aspects of the present disclosure. As shown, the voltage sense harness 909 may extend centrally along a longitudinal dimension (corresponding to a major dimension) of the battery module 902. In some embodiments, the voltage sense harness 909 is integrated into a material 920 (e.g., laminate material) into which each of the conductor layers of the current collector assembly 904 is also integrated. Alternatively, in some embodiments, the voltage sense harness 909 is coupled to the material 920 by an adhesive (e.g., pressure sensitive adhesive).

The voltage sense harness 909 can couple (e.g., electrically couple) to each conductor layer of a current collector assembly 904. For example, the voltage sense harness 909 is coupled to a conductor layer 910*a*, a conductor layer 910*b*, a conductor layer 910*c*, and a conductor layer 910*d*, each of which are representative of several additional conductor layers. Each of the conductor layers are coupled (e.g., electrically coupled) to several battery cells, thereby placing the battery cells in parallel. For example, the conductor layer 910*a* is electrically coupled to a battery cell 930*a*, a battery cell 930*b*, a battery cell 930*c*, and a battery cell 930*d*, each of which are representative of several additional battery cells. The 910*a* conductor layer electrically couples the battery cells 930*a*, 930*b*, 930*c*, and 930*d* in parallel. Further, the voltage sense harness 909 can determine a voltage and current of battery cells of the battery module 902, and provide the voltage and current, respectively, to a battery management system (not shown in FIG. 11). For example, the voltage sense harness 909 can determine a voltage and current of battery cells of the battery cells 930*a*, 930*b*, 930*c*, and 930*d*, and provide the voltage and the current, respectively, to a battery management system.

FIG. 12 illustrates a partial plan view of a battery module 1002, showing a voltage sense harness 1009 implemented as an assembly, in accordance with aspects of the present disclosure. The battery module 1002 may include a current collector assembly 1004 that includes several conductor layers, with each conductor capable of electrically coupling to several battery cells in a manner previously described. The voltage sense harness 1009 may include several traces (e.g., metal traces) electrically coupled to a respective conductor layer of the current collector assembly 1004. For example, as shown in the enlarged view, a trace 1011*a* is electrically coupled to a conductor layer 1010*a*, a trace 1011*b* is electrically coupled to a conductor layer 1010*b*, a trace 1011*c* is electrically coupled to a conductor layer 1010*c*, and a trace 1011*d* is electrically coupled to a conductor layer 1010*d*. Each of the traces 1011*a*, 1011*b*, 1011*c*, and 1011*d*, representative of additional traces, can couple (e.g., electrically couple) the conductor layer 1010*a*, the conductor layer 1011*b*, the conductor layer 1010*c*, and the conductor layer 1010*d*, respectively, to, for example, battery control circuitry (e.g., battery management system). As a result, a trace electrically coupled to a conductor layer can provide voltage and current information related to battery cells connected together in parallel by the conductor layer.

Figure 13:
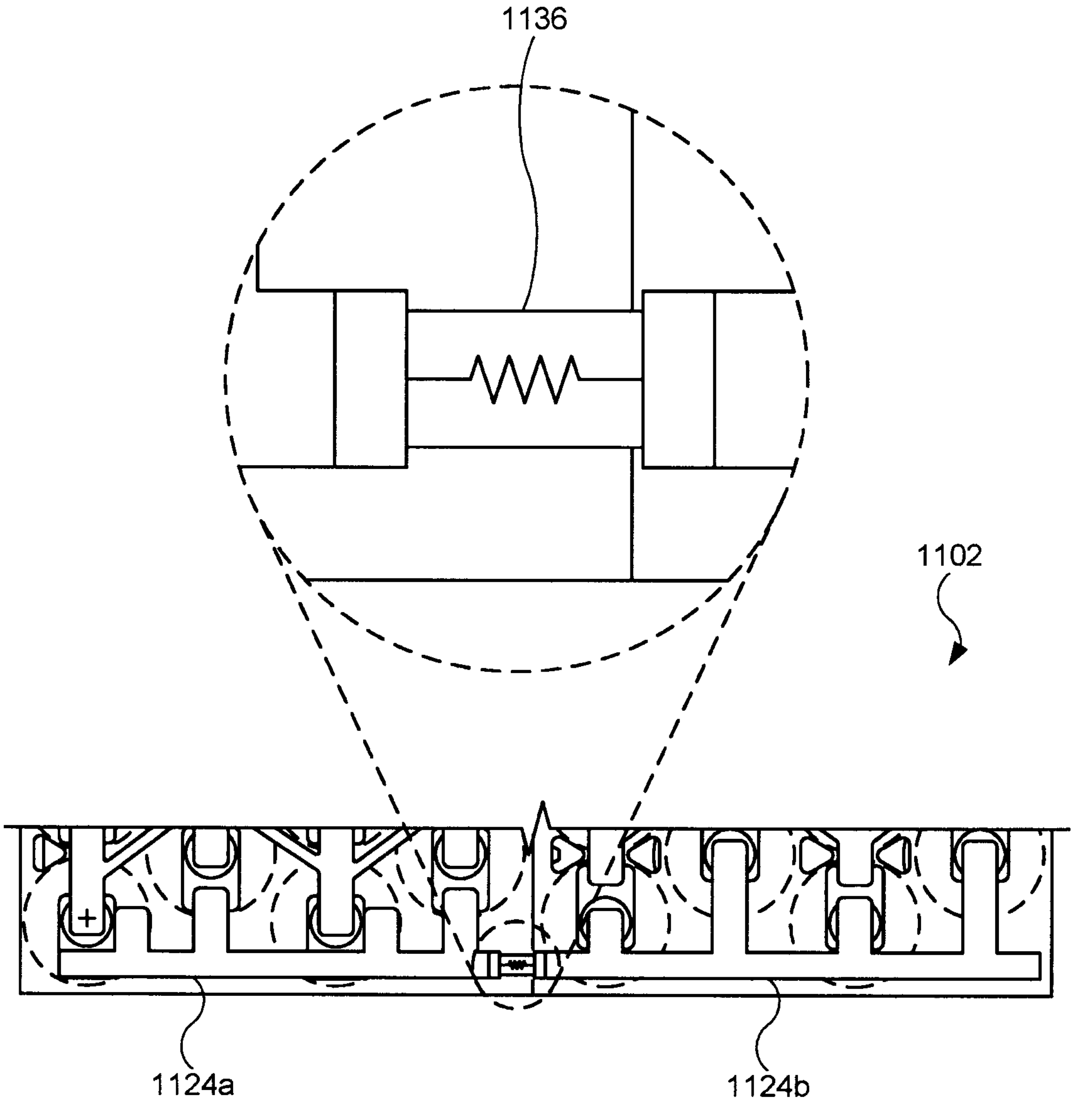
FIG. 13 and FIG. 14 illustrate alternate embodiments of a bus bar, in accordance with aspects of the present disclosure.
Figure 14:
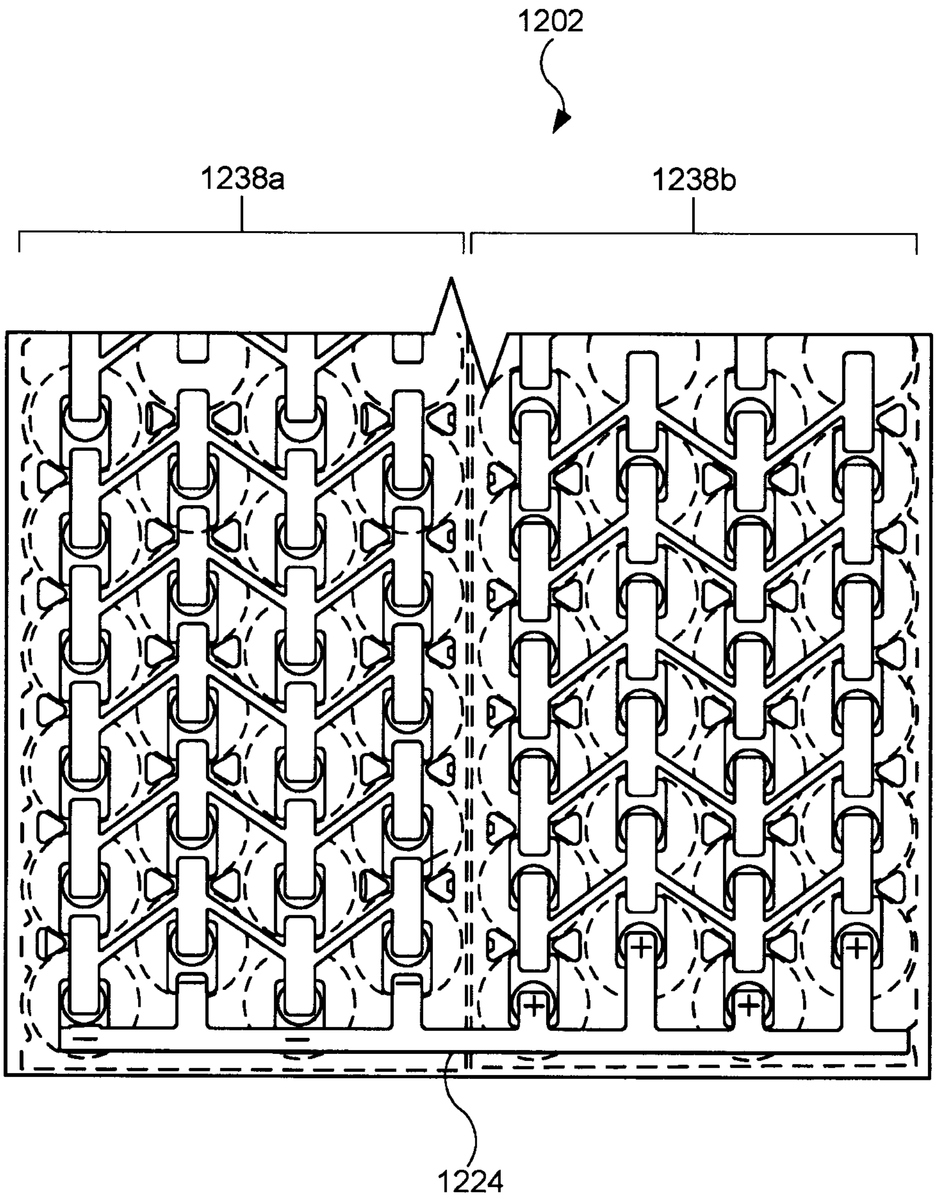

FIGS. 13 and 14 illustrate alternate embodiments of a bus bar, in accordance with aspects of the present disclosure. FIG. 13 illustrates a plan view of a battery module 1102 that includes a bus bar 1124*a* and a bus bar 1124*b*. As shown in the enlarged view, the bus bars 1124*a* and 1124*b* are connected by a fuse 1136. The fuse 1136 is designed to allow electrical current flow between the bus bars 1124*a* and 1124*b*. The fuse 1136 is rated for a particular electrical current such that an electrical current flowing through the fuse 1136 that exceeds the rating causes the fuse 1136 to melt or break, thereby removing the electrical connection between the bus bars 1124*a* and 1124*b*. The bus bars 1124*a* and 1124*b* are rated for a higher electrical current than that of the fuse 1136. Beneficially, the bus bars 1124*a* and 1124*b* are electrically coupled together by the fuse 1136 but become electrically disconnected when the fuse 1136 melts or breaks, thus reducing or eliminating the likelihood of a thermal event.

FIG. 14 illustrates a perspective view of a battery module 1202 that includes a bus bar 1224 that spans a widthwise dimension of the battery module 1202. By spanning a dimension, the bus bar 1124 may extend, or approximately extend, a minor dimension (e.g., widthwise dimension) of the battery module 1202. In some embodiments, the bus bar 1224 connects to both positive and negative terminals of respective battery cells. For example, the battery module 1202 may include a set of battery cells 1238*a* and a set of battery cells 1238*b*, with each set of battery cells having four columns of battery cells. The bus bar 1224 includes a size and shape to connect with a battery cell in each of eight columns (four battery cells from each of the set of battery cells 1238*a* and the set of battery cells 1238*b*) for a total of eight battery cells. Moreover, the bus bar 1224 may connect to respective negative terminals of four battery cells in the set of battery cells 1238*a*, as well as to respective positive terminals of four battery cells in the set of battery cells 1238*b*. While one end of the battery module 1202 may include two bus bars (e.g., in FIG. 9), the opposing end show in FIG. 14 may include a single bus bar (e.g., bus bar 1224). Beneficially, bus bar 1224 may reduce the number of components of the battery module 1202.

Figure 15:
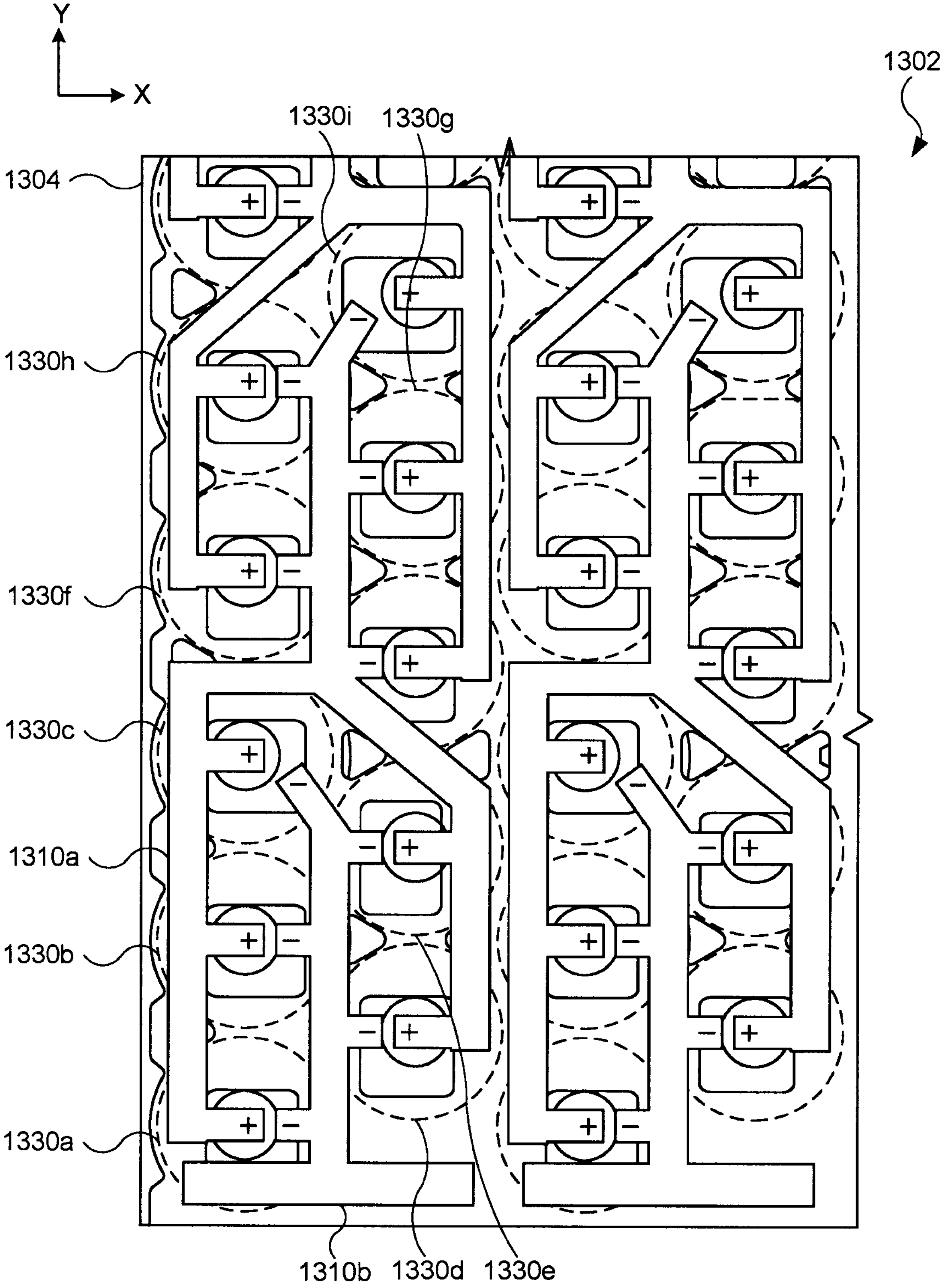
FIG. 15 illustrates a plan view of a battery module, showing an alternate set of conductor layers in a current conductor assembly, in accordance with aspects of the present disclosure.

FIG. 15 illustrates a plan view of a battery module 1302, showing an alternate set of conductor layers in a current conductor assembly 1304, in accordance with aspects of the present disclosure. A partial region of the battery module 1302 is shown, and an additional region (not shown) may be present. The battery module 1302 includes a current collector assembly 1304 with conductor layers having different shapes. For example, the current collector assembly 1304 includes a conductor layer 1310*a* and a conductor layer 1310*b*, with the conductor layers 1310*a* and 1310*b* having different shapes. The layout of the conductor layers 1310*a* and 1310*b* represent a vertical layout as opposed to a horizontal layout in prior layouts of conductor layouts. In this regard, each of the conductor layers 1310*a* and 1310*b* can electrically couple (in parallel) at least some battery cells that are in the same column, with each column representing a longitudinal dimension (e.g., along the Y-axis) or major dimension of the battery module 1302. Additionally, however, each of the conductor layers 1310*a* and 1310*b* can also electrically couple (in parallel) battery cells that are in different columns, with different columns extending along a widthwise dimension (e.g., along the X-axis) or minor dimension of the battery module 1302.

As shown, the conductor layer 1310*a* is electrically coupled to respective positive terminals of a battery cell 1330*a*, a battery cell 1330*b*, a battery cell 1330*c*, a battery cell 1330*d*, and a battery cell 1330*e*. Accordingly, the conductor layer 1310*a* electrically couples the battery cells 1330*a*, 1330*b*, 1330*d*, and 1330*e* in parallel. Additionally, the conductor layer 1310*a* electrically couples to respective negative terminals of a battery cell 1330*f*, a battery cell 1330*g*, a battery cell 1330*h*, and a battery cell 1330*i*. The conductor layer 1310*b* connects to respective negative terminals of the battery cells 1330*a*, 1330*b*, 1330*d*, and 1330*e* in parallel. Additional, similar connections using similar conductor layers are shown in FIG. 15.

Figure 16:
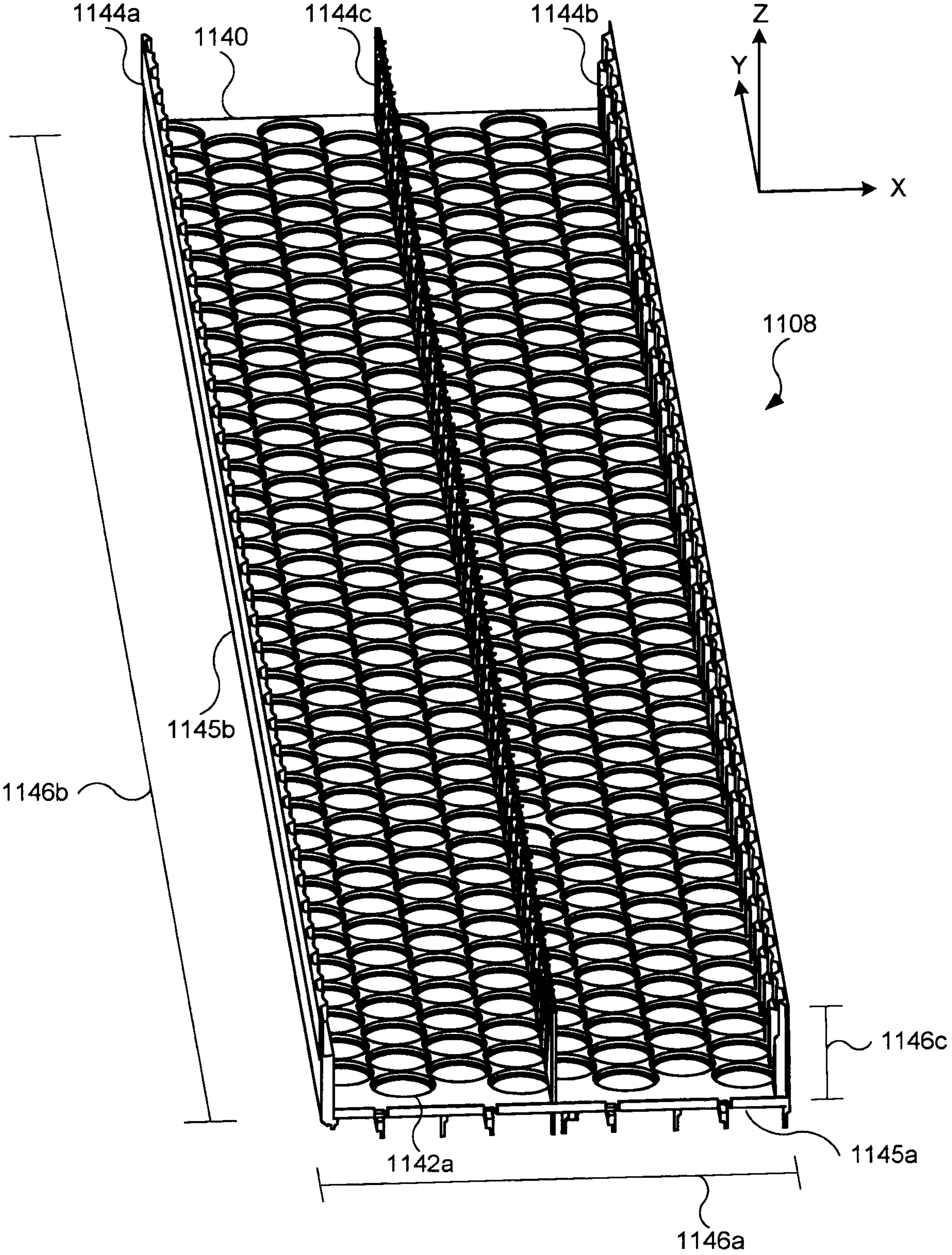
FIG. 16 illustrates a perspective view of an embodiment of a carrier, in accordance with aspects of the present disclosure.

FIG. 16 illustrates a perspective view of an embodiment of a carrier 1108, in accordance with aspects of the present disclosure. The carrier 1108 is designed to receive and hold several battery cells (not shown in FIG. 16). In this regard, the carrier 1108 may include a base 1140 that includes several cell bores, such as a cell bore 1142*a* (representative of additional cell bores). The cell bore 1142*a* represents a through hole in the base 1140. Each cell bore in the base 1140 is designed to receive a battery cell.

The carrier 1108 further includes several walls extending from the base 1140. For example, the carrier 1108 includes a wall 1144*a* and a wall 1144*b*, each of which may be referred to as an outer wall. The carrier 1108 further includes a wall 1144*c* between the walls 1144*a* and 1144*b*. Based on the position relative to the walls 1144*a* and 1144*b*, the wall 1144*c* may be referred to as a middle wall. Also, each of the walls 1144*a*. 1144*b*, and 1144*c*, may extend perpendicular from, or at least substantially perpendicular from, the base 1140. Accordingly, the walls 1144*a*. 1144*b*, and 1144*c* may be parallel, or at least substantially parallel.

The carrier 1108 may include one or more non-electrically conductive materials. For example, carrier 1108 may include a resin. However, other polymer-based materials are possible. Beneficially, by using non-electrically conductive materials (e.g., non-metals), the carrier 1108 provides a robust, relatively lightweight carrier, which can reduce the overall weight of a vehicle that uses the carrier 1108. Also, the carrier 1108 may be formed by a molding operation or by a three-dimensional printing operation, as non-limiting examples.

The carrier 1108 may include several dimensional relationships. For example, the carrier 1108 may include a side 1145*a* with a dimension 1146*a* (e.g., width) and a side 1145*b* with a dimension 1146*b* (e.g., length). As shown, the side 1145*a* and the side 1145*b* extend along the X-axis and the Y-axis, respectively. The sides 1145*a* and 1145*b* may combine to define the area of the base 1140. The dimension 1146*a* may be approximately in the range of 300 to 500 mm, and the dimension 1146*b* may be approximately in the range of 1,600 to 2,000 mm. In some embodiments, the dimension 1146*a* is 370 mm (or about 370 mm) and the dimension 1146*b* is 1,800 mm (or about 1,800 mm). In this manner, the side 1145*b* can define a major dimension having the greater length compared to other dimensions, and can be four times greater than the side 1145*a*. Also, as shown in FIG. 16, each of the walls 1144*a*, 1144*b*, and 1144*c* may span the entire length of the base 1140, and as a result, each of the walls 1144*a*, 1144*b*, and 1144*c* may include a dimension that is equal to, or at least substantially equal to, the dimension 1146*b*.

Also, each of the walls 1144*a*, 1144*b*, and 1144*c* may extend to a dimension 1146*c* (e.g., height) that extends along the Z-axis. The dimension 1146*c* may be approximately in the range of 80 to 120 mm. In some embodiments, the dimension 1146*c* is 95 mm (or about 95 mm). In some embodiments, each of the walls 1144*a*, 1144*b*, and 1144*c* includes a different dimension, with each dimension being in the given range for the dimension 1146*c*. Further, in some embodiments, the dimension 1146*c* of each of the walls 1144*a*, 1144*b*, and 1144*c* is selected such that when battery cells are positioned in the cell bores, the walls 1144*a*, 1144*b*, and 1144*c* extend to a height that matches a height of at least some, if not all, of the battery cells.

Figure 17:
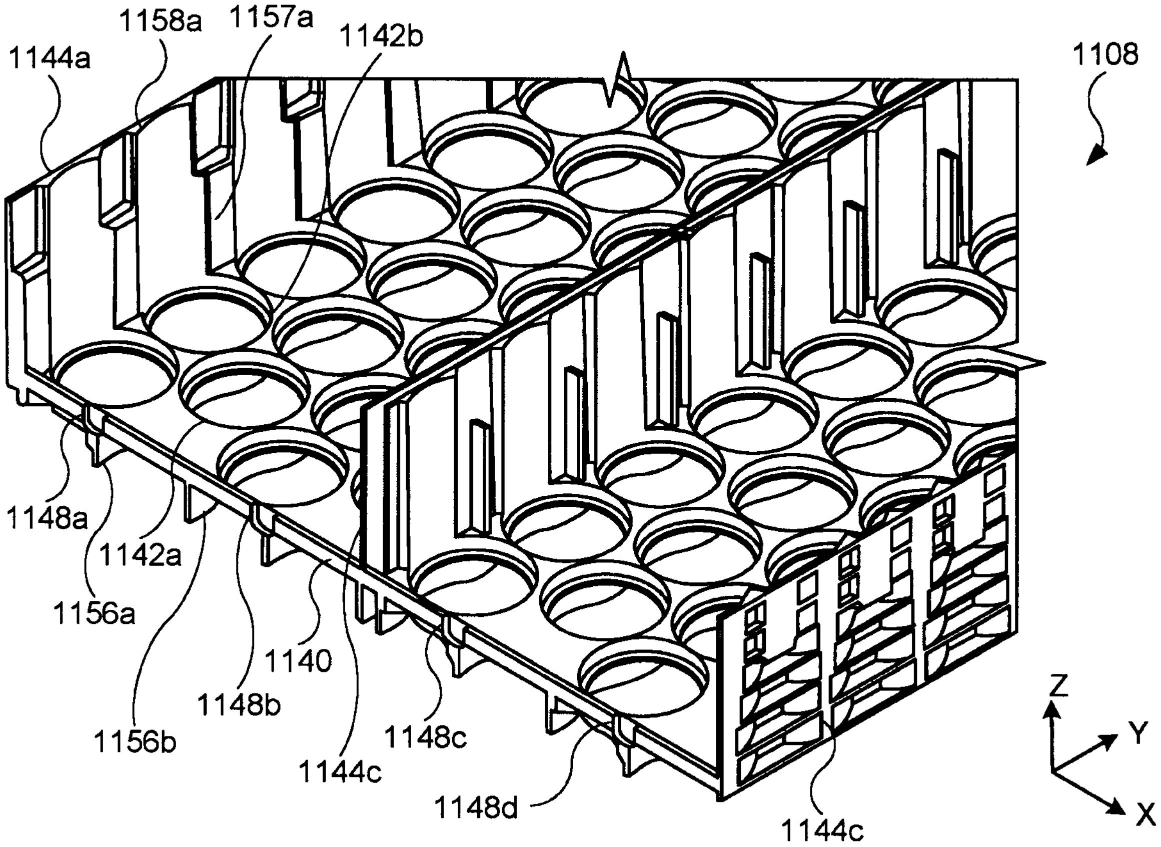
FIG. 17 illustrates an enlarged perspective view of a carrier, in accordance with aspects of the present disclosure.

FIG. 17 illustrates an enlarged perspective view of the carrier 1108, showing additional features, in accordance with aspects of the present disclosure. In addition to the cell bores (e.g., cell bore 1142*a*), the base 1140 include several grooves. For example, the base 1140 includes a groove 1148*a*, a groove 1148*b*, a groove 1148*c*, and a groove 1148*d* formed at an edge of the base 1140. Each of the grooves 1148*a*, 1148*b*, 1148*c*, and 1148*d* is designed to receive a cooling tube or other structure. Also, the carrier 1108 further includes a rib 1156*a* and a rib 1156*b*. These features will be shown and described further below.

Also, each of the walls 1144*a*, 1144*b*, and 1144*c* include several arcs, or curved surfaces, designed to further accommodate the battery cells in the carrier 1108. For example, the wall 1144*a* includes a surface 1157*a*, with the surface 1157*a* having an arc 1158*a* aligned with a cell bore 1142*b*. An element that "aligns," "aligns with," or "is aligned with" another element refers to the elements arranged in a straight line. As shown, the arc 1158*a* and the cell bore 1142*b* are aligned with a line (not shown) that extends parallel with respect to the Z-axis.

Figure 18:
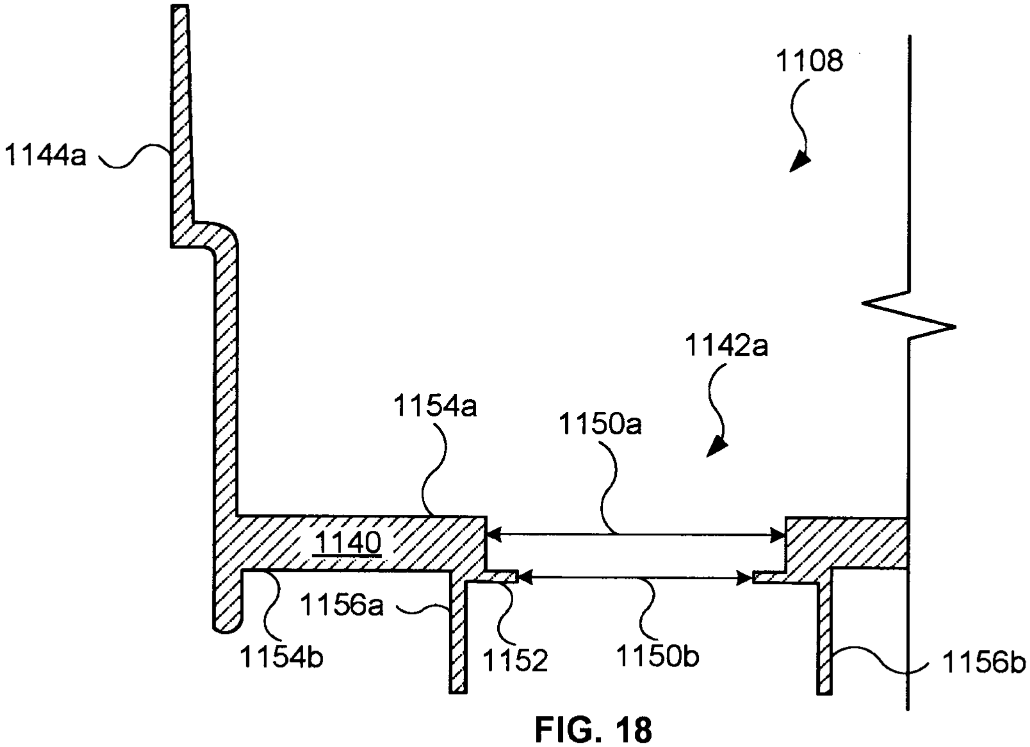
FIG. 18 illustrates a cross-sectional view of a carrier, in accordance with aspects of the present disclosure.

FIG. 18 illustrates a cross-sectional view of the carrier 1108, in accordance with aspects of the present disclosure. The cell bore 1142*a* includes a dimension 1150*a*, representing a diameter of the cell bore 1142*a*. The dimension 1150*a* may be greater than a dimension of a battery cell (e.g., dimension 222*a*, or battery cell diameter, of the battery cell 120 in FIG. 2D). Accordingly, when a battery cell includes a dimeter of 80 mm, the dimension 1150*a* is greater than 80 mm, and is typically larger by a few mm (e.g., 2-5 mm).

Further, a ledge 1152 is positioned within the cell bore 1142*a*. The ledge 1152 may include a circular, or at least approximately circular, ledge. The cell bore 1142*a* further includes a dimension 1150*b* representing an additional diameter of the cell bore 1142*a* based on the ledge 1152. As shown, the dimension 1150*b* is less than the dimension 1150*a*. Additionally, the dimension 1150*b* is less than a dimension of a battery cell. Accordingly, when a battery cell includes a dimeter of 80 mm, the dimension 1150*b* is less than 80 mm. As a result, the cell bore 1142*a* is designed to receive, or at least partially receive, a battery cell, and the ledge 1152 provides a platform on which the battery cell is seated. Additionally, the ledge 1152 provides a surface that can receive an adhesive (not shown in FIG. 18), thereby allowing a battery cell to secure to the ledge 1152 using the adhesive.

Further, the base 1140 includes a surface 1154*a* and a surface 1154*b* opposite the surface 1154*a*. The surface 1154*a* and the surface 1154*b* may be referred to as a top surface and a bottom surface, respectively. The wall 1144*a* (as well as the walls 1144*b* and 114*c*, shown in FIG. 16) extend from the surface 1154*a* of the base 1140. Conversely, each of the ribs 1156*a* and 1156*b* extends from the surface 1154*b* of the base 1140. Also, the ribs 1156*a* and 1156*b* combine to surround the cell bore 1142*a*. Beneficially, in the event of a gas exiting a battery cell located in the cell bore 1142*a*, the ribs 1156*a* and 1156*b* act as a vent channel for the gas that passes through the cell bore 1142*a*. Referring to FIG. 17, ribs 1156*a* and 1156*b* cause a gas passing through the cell bore 1142*a* to travel lengthwise (in the Y-direction) of the carrier 1108. Accordingly, the ribs 1156*a* and 1156*b* may cause (e.g., direct) the gas to exit through vents (not shown in FIG. 18).

Figure 19:
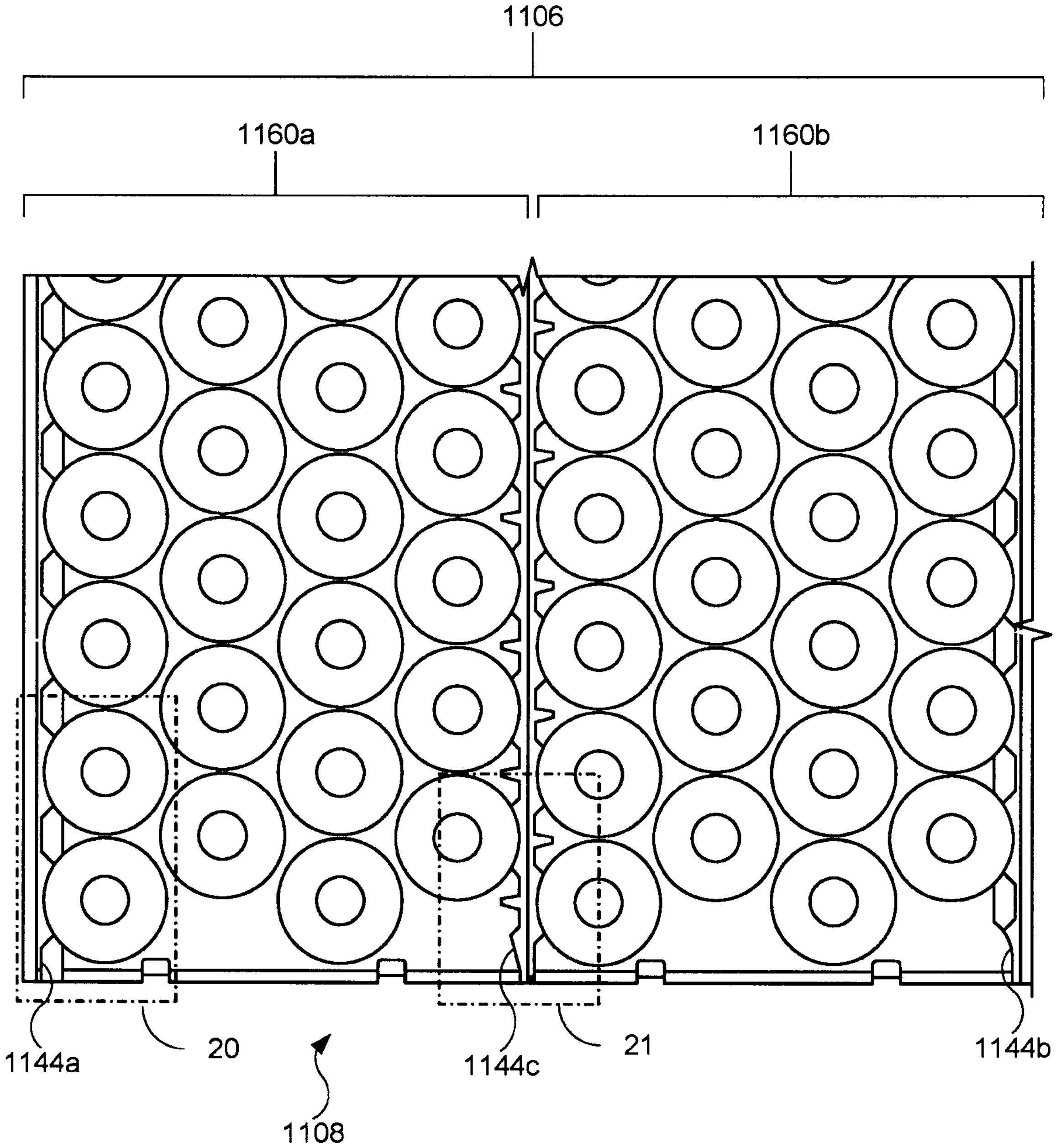
FIG. 19 illustrates a plan view of a carrier carrying battery cells within respective cell bores of the carrier, in accordance with aspects of the present disclosure.

FIG. 19 illustrates a plan view of the carrier 1108 carrying battery cells 1106 within respective cell bores (not shown in FIG. 19) of the carrier 1108, in accordance with aspects of the present disclosure. For purposes of illustration, a current collector assembly is not shown. The walls 1144*a*, 1144*b*, and 1144*c* are designed to accommodate at least some of the battery cells by including several arcs aligned with a respective cell bore. This will be shown and described further below. Also, the wall 1144*c*, representing a middle wall, separates the battery cells 1106 into a set of battery cells 1160*a* and a set of battery cells 1160*b*. The position of the wall 1144*c* may separate the battery cells 1106 equally between the set of battery cells 1160*a* and the set of battery cells 1160*b*. Additionally, the wall 1144*c* may limit or prevent unwanted movement of at least some of the battery cells 1106, while enhancing the overall structural rigidity to the carrier 1108.

Figure 20:
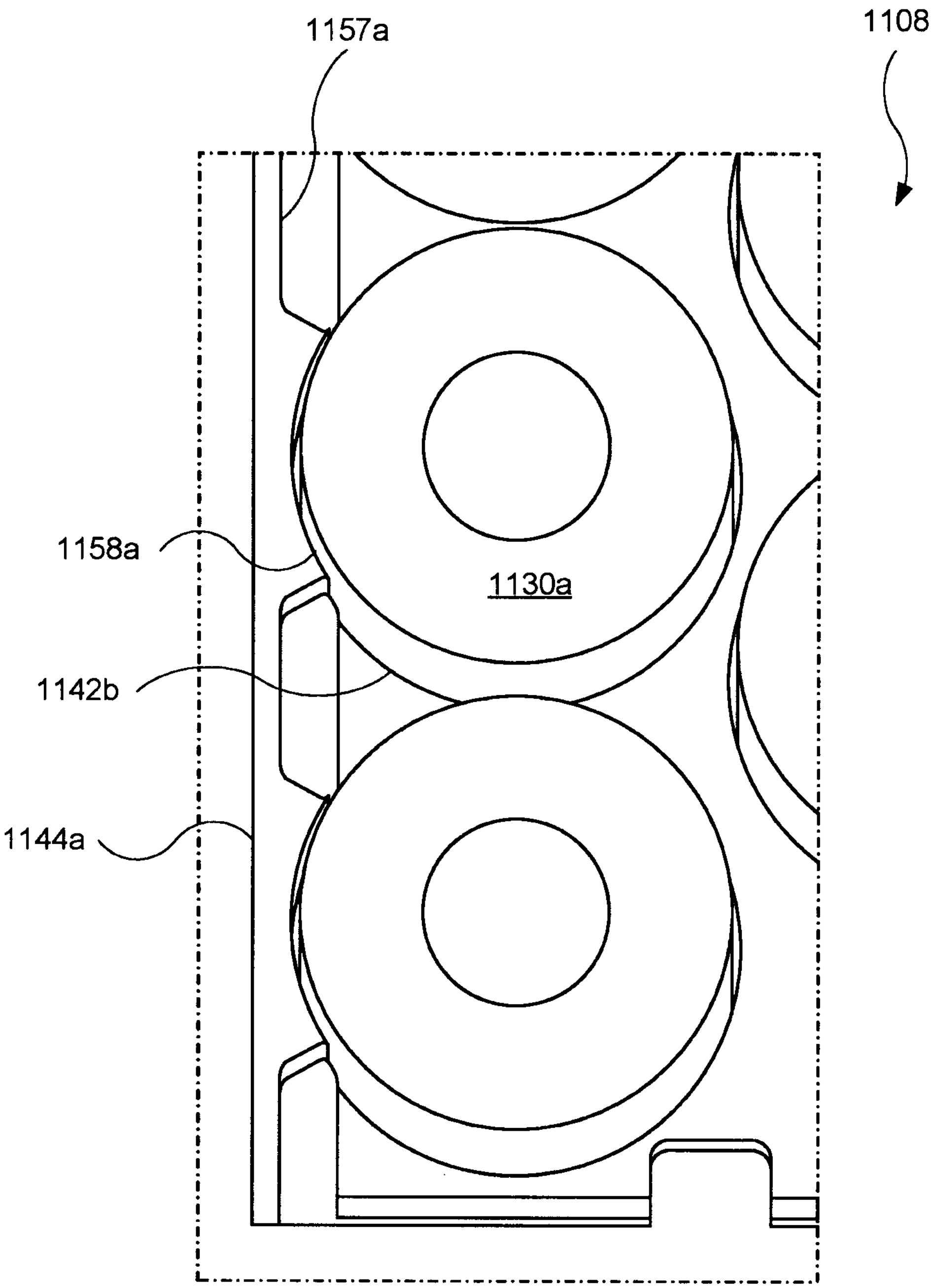
FIG. 20 and FIG. 21 illustrate enlarged plan views of the carrier shown in FIG. 19, in accordance with aspects of the present disclosure.
Figure 21:
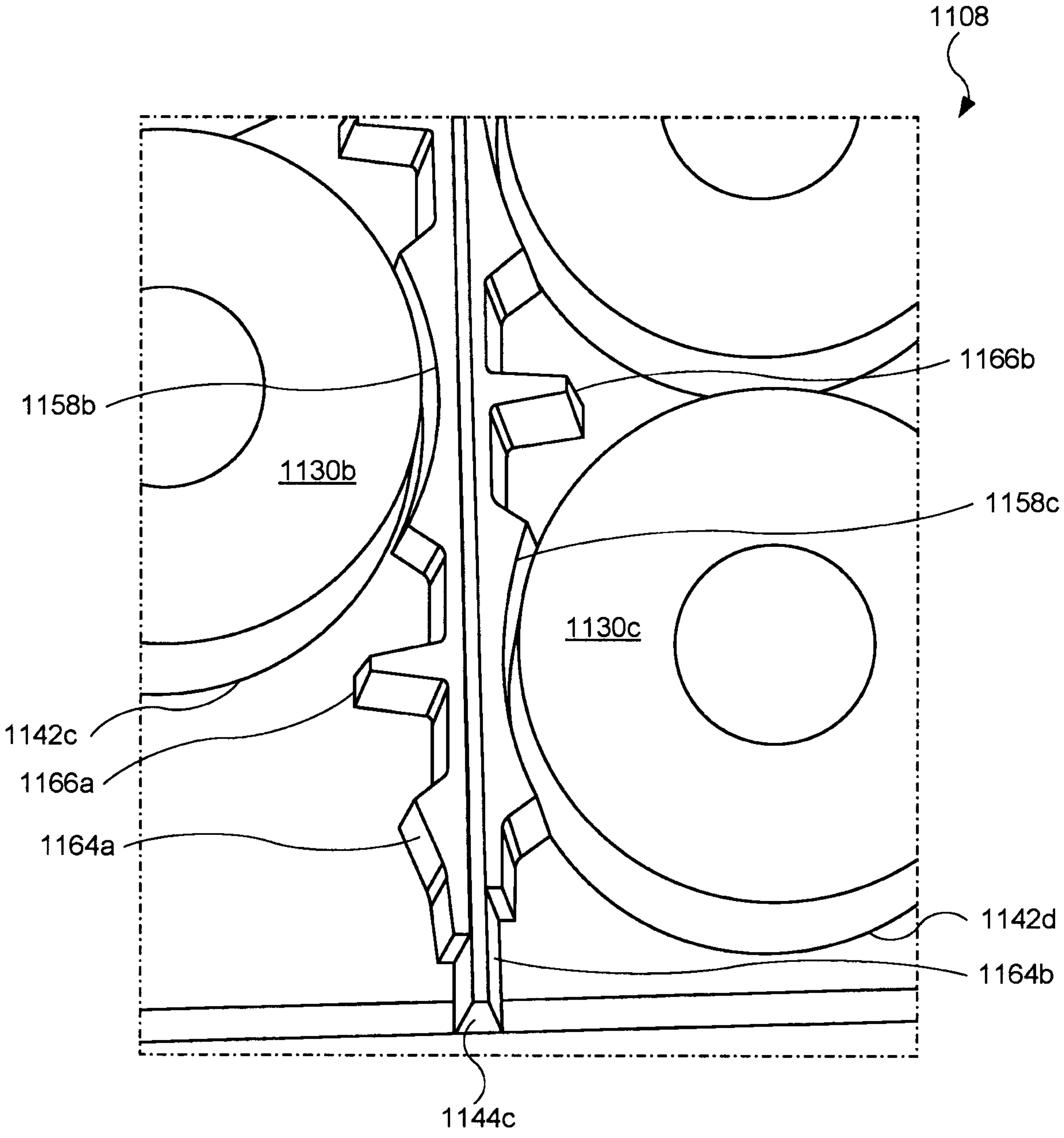

FIGS. 20 and 21 illustrate enlarged plan views of the carrier 1108 shown in FIG. 19, in accordance with aspects of the present disclosure. FIG. 20 shows the arc 1158*a* formed on a surface 1157 of the wall 1144*a*. Additionally, a battery cell 1130*a* disposed in the cell bore 1142*b*. Based on shape (e.g., curvature) of the arc 1158*a*, the arc 1158*a* conforms to the shape of the battery cell 1130*a*. Accordingly, the arc 1158*a* (representative of additional arcs described herein) may be characterized as a conforming surface. When an arc "conforms" or "is conforming" to a battery cell, the arc may include a shape (e.g., radius of curvature) that corresponds, or at least substantially corresponds, to a radius of a battery cell. In this regard, an arc includes a curved surface with a generally similar radius of curvature as that of the (cylindrical) battery cell radius. Additionally, based on the alignment between the arc 1158*a* and the cell bore 1142*b*, the wall 1144*a* partially receives the battery cell 1130*a* at the arc 1158*a*. The arc 1158*a* is representative of several additional arcs in the wall 1144*a* (shown in FIG. 16).

FIG. 21 shows the wall 1144*c* with multiple surfaces, with each surface having arcs. For example, the wall 1144*c* includes a surface 1164*a* and a surface 1164*b* opposite the surface 1164*a*. The surface 1164*a* and the surface 1164*b* include an arc 1158*b* and an arc 1158*c*, respectively. The arc 1158*b* and the arc 1158*c* are aligned with a cell bore 1142*c* and a cell bore 1142*d*, respectively. Additionally, a battery cell 1130*b* and a battery cell 1130*c* are disposed in the cell bore 1142*c* and the cell bore 1142*d*, respectively. Based on conforming shape of the arc 1158*b* formed on the surface 1164*a* and the alignment between the arc 1158*b* and the cell bore 1142*c*, the wall 1144*c* partially receives the battery cell 1130*b* at the arc 1158*b*. Similarly, based on shape of the arc 1158*c* formed on the surface 1164*b* and the alignment between the arc 1158*c* and the cell bore 1142*d*, the wall 1144*c* partially receives the battery cell 1130*c* at the arc 1158*c*. The arc 1158*b* and the arc 1158*c* are representative of several additional arcs formed in the surface 1164*a* and the surface 1164*b*, respectively, of the wall 1144*c*.

To further provide stability, the wall 1144*c* may include ribs. For example, the wall 1144*c* includes a rib 1166*a* and a rib 1166*b* extending from the surface 1164*a* and the surface 1164*b*, respectively. The ribs 1166*a* and 1166*b* are representative of several additional ribs extending from the surfaces 1164*a* and 1164*b*, respectively, of the wall 1144*c*. Beneficially, based on the ribs 1166*a* and 1166*b*, the wall 1144*c* is less susceptible to unwanted movement based on an external load (e.g., external force) applied to the carrier 1108, thus providing increased stability of the carrier 1108 and less unwanted movement of the battery cells (e.g., battery cells 1130*a* and 1130*b*).

Figure 22:
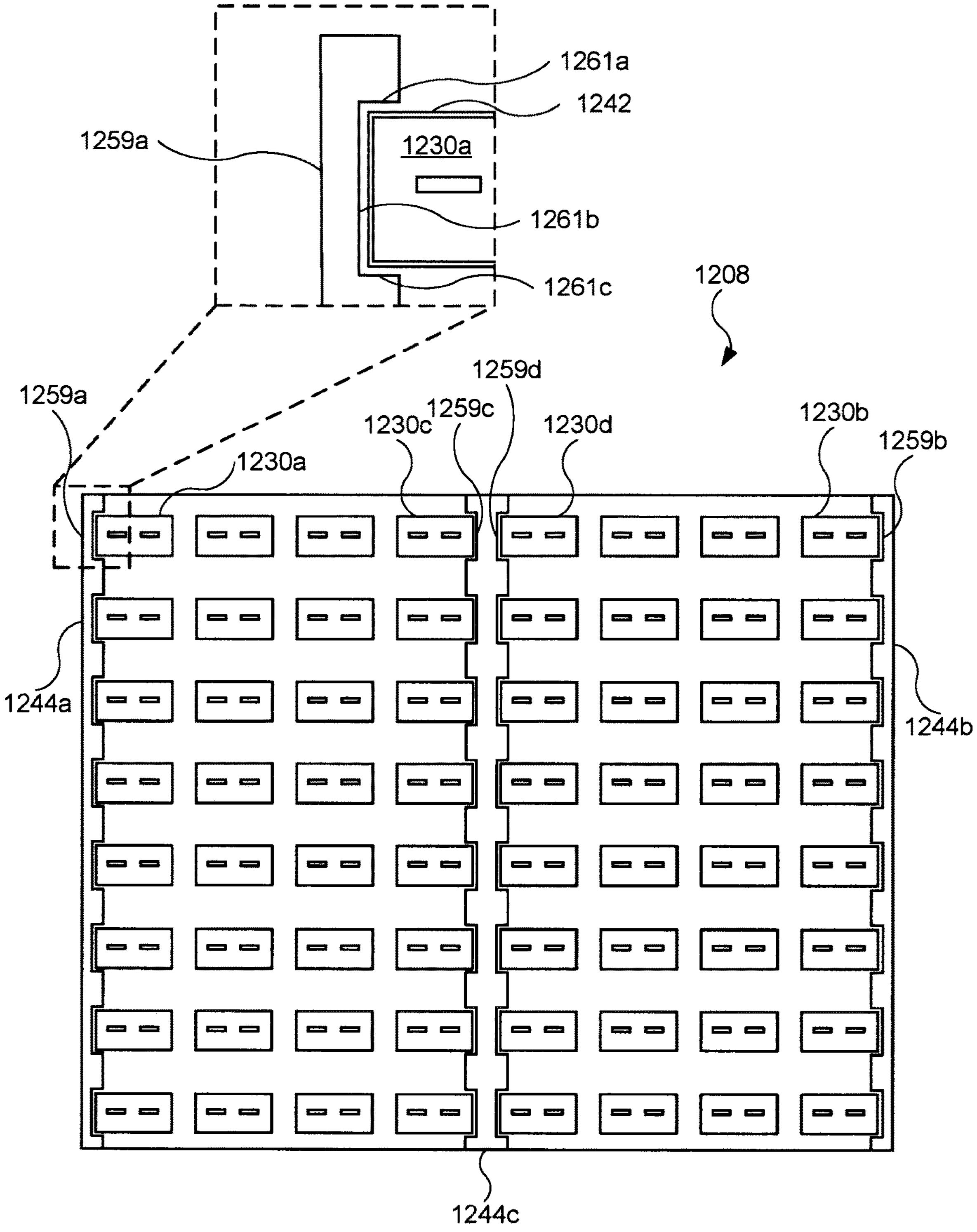
FIG. 22 illustrates a plan view of a carrier having walls designed to accommodate prismatic or pouch battery cells, in accordance with aspects of the present disclosure.

FIG. 22 illustrates a plan view of a carrier 1208 having walls designed to accommodate battery cells with different shapes, in accordance with aspects of the present disclosure. Although not expressly shown, the carrier 1208 may include various features (e.g., cell bores, ribs, etc.) shown and described herein for a carrier. As shown, the carrier 1208 is holding several battery cells, including a battery cell 1230*a*, a battery cell 1230*b*, a battery cell 1230*c*, and a battery cell 1230*d*, with the battery cells 1230*a*, 1230*b*, 1230*c*, and 1230*d* being representative of additional battery cells held by the carrier 1208. In some embodiment, the battery cells 1230*a*, 1230*b*, 1230*c*, and 1230*d* take the form of a prismatic battery cell (e.g., similar to the battery cell 215 shown in FIG. 2E). Alternatively, in some embodiments, the battery cells 1230*a*, 1230*b*, 1230*c*, and 1230*d* take the form of a pouch cell (e.g., similar to the battery cell 215 shown in FIG. 2F).

The carrier 1208 may include several walls. For example, the carrier 1208 includes a wall 1244*a*, a wall 1244*b*, and a wall 1244*c* between the walls 1244*a* and 1244*b*. Each of the walls 1244*a*, 1244*b*, and 1244*c* may include indentations designed to accommodate several battery cells. For example, the wall 1244*a* include an indentation 1259*a* that accommodates the battery cell 1230*a* by at least partially receiving the battery cell 1230*a*. As shown in the enlarged view, the indentation 1259*a* (representative of additional indentations) includes a surface 1261*a*, a surface 1261*b*, and a surface 1261*c*. Each of the surfaces 1261*a*, 1261*b*, and 1261*c* may be characterized as a planar surface. In some embodiments, the surfaces 1261*a* and 1261*c* are parallel, or at least substantially parallel. Further, in some embodiments, the surface 1261*b* is perpendicular, or at least substantially perpendicular, with respect to the surfaces 1261*a* and 1261*c*. Additionally, the carrier 1208 includes a cell bore 1242 designed to receive the battery cell 1230*a*. Although not expressly shown, the carrier 1208 may include additional cell bores similar to the cell bore 1242 for each battery cell shown in FIG. 22 that is carried by the carrier 1208.

Also, the wall 1244*b* include an indentation 1259*b* that accommodates the battery cell 1230*b* by at least partially receiving the battery cell 1230*b*. The wall 1244*c* may include multiple surfaces, with each surface having several indentations formed therein. For example, the wall 1244*c* includes an indentation 1259*c* formed in a surface as well as an indentation 1259*d* formed in an opposing surface. The indentation 1259*c* and the indentation 1259*d* accommodate the battery cell 1230*c* and the battery cell 1230*d*, respectively, by at least partially receiving the battery cell 1230*c* and the battery cell 1230*d*, respectively. Similar to arcs described herein, the indentations 1259*a*, 1259*b*, 1259*c*, and 1259*d* (representative of several additional indentations) provide a conforming structure (e.g., using a set of surfaces) that conform to the shape of the battery cells 1230*a*, 1230*b*, 1230*c*, and 1230*d*, respectively. In this regard, the indentations 1259*a*, 1259*b*, 1259*c*, and 1259*d* may include three surfaces that collectively conform to a rectangular, or at least substantially rectangular, structure such as a battery with a prismatic or pouch design.

Figure 23:
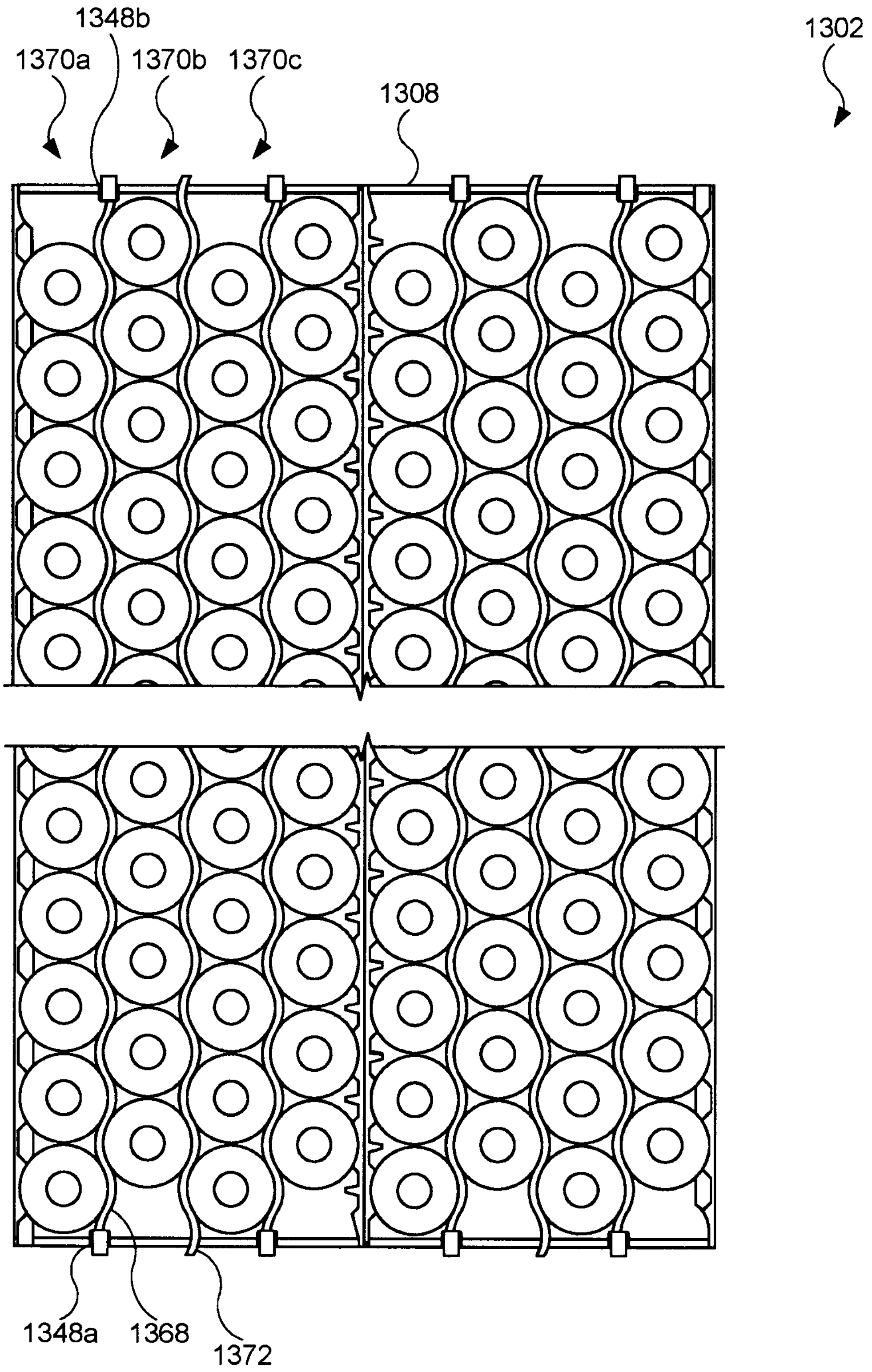
FIG. 23 illustrates a plan view of a battery module of a battery pack, further showing cooling tubes and standoffs, in accordance with aspects of the present disclosure.

FIG. 23 illustrates a plan view of a battery module 1302 of a battery pack, further showing cooling tubes and standoffs, in accordance with aspects of the present disclosure. The battery module 1302 includes a carrier 1308 with several battery cells in the carrier 1308. A cooling tube 1368 is interweaved between battery cells in a column 1370*a* of battery cells and battery cells in a column 1370*b* of battery cells adjacent to the column 1370*a* of battery cells. By interweaving, the cooling tube 1368 includes multiple bends or turns such that the cooling tube 1368 passes between battery cells and cell bores. The cooling tube 1368 (representative of several additional cooling tubes shown in FIG. 23) may contact each battery cell in the column 1370*a* of battery cells and the column 1370*b* of battery cells. Further, the cooling tube 1368 may include a hollow body that allows a cooling fluid (e.g., a water ethylene glycol solution) to pass through the cooling tube 1368, thereby cooling battery cells in the column 1370*a* of battery cells and the column 1370*b* of battery cells. Also, the cooling tube 1368 may include a metal (e.g., steel, copper, aluminum) to increase heat transfer based on the relatively high thermal conductivity of the metal. However, the cooling tube 1368 can be coated with a dielectric material to isolate (e.g., electrically isolate) the cooling tube 1368 from the battery cells in the column 1370*a* of battery cells and the column 1370*b* of battery cells. Also, as shown in FIG. 23, the cooling tube 1368 extends an edge-to-edge length (representing a major dimension) of the carrier 1308. Accordingly, the cooling tube 1368 includes a dimension equal to, or at least substantially equal to, that of the carrier 1308. Also, the carrier 1308 includes a groove 1348*a* and a groove 1348*b* at opposing edges of the carrier 1308, and the cooling tube 1368 is disposed in the grooves 1348*a* and 1348*b*.

Additional structures may be integrated with the battery module 1302. For example, a separating structure 1372 is interweaved between the column 1370*b* of battery cells and a column 1370*c* of battery cells adjacent to the column 1370*b* of battery cells. Similar to the cooling tube 1368, the separating structure 1372 includes multiple bends or turns such that the separating structure 1372 passes between battery cells and cell bores. The separating structure 1372 (representative of several additional separating structures shown in FIG. 23) provide consistent separation between battery cells in the column 1370*b* of battery cells and the column 1370*c* of battery cells. In some embodiments, the separating structure 1372 is a standoff integrally formed with the carrier 1308. The phrase "integrally formed with" refers to two or more structures fabricated together using the same materials during the same or similar manufacturing operation (e.g., molding). Alternatively, in some embodiments, the separating structure 1372 is an insert formed from foam, plastic, or paper, as non-limiting examples.

Figure 24:
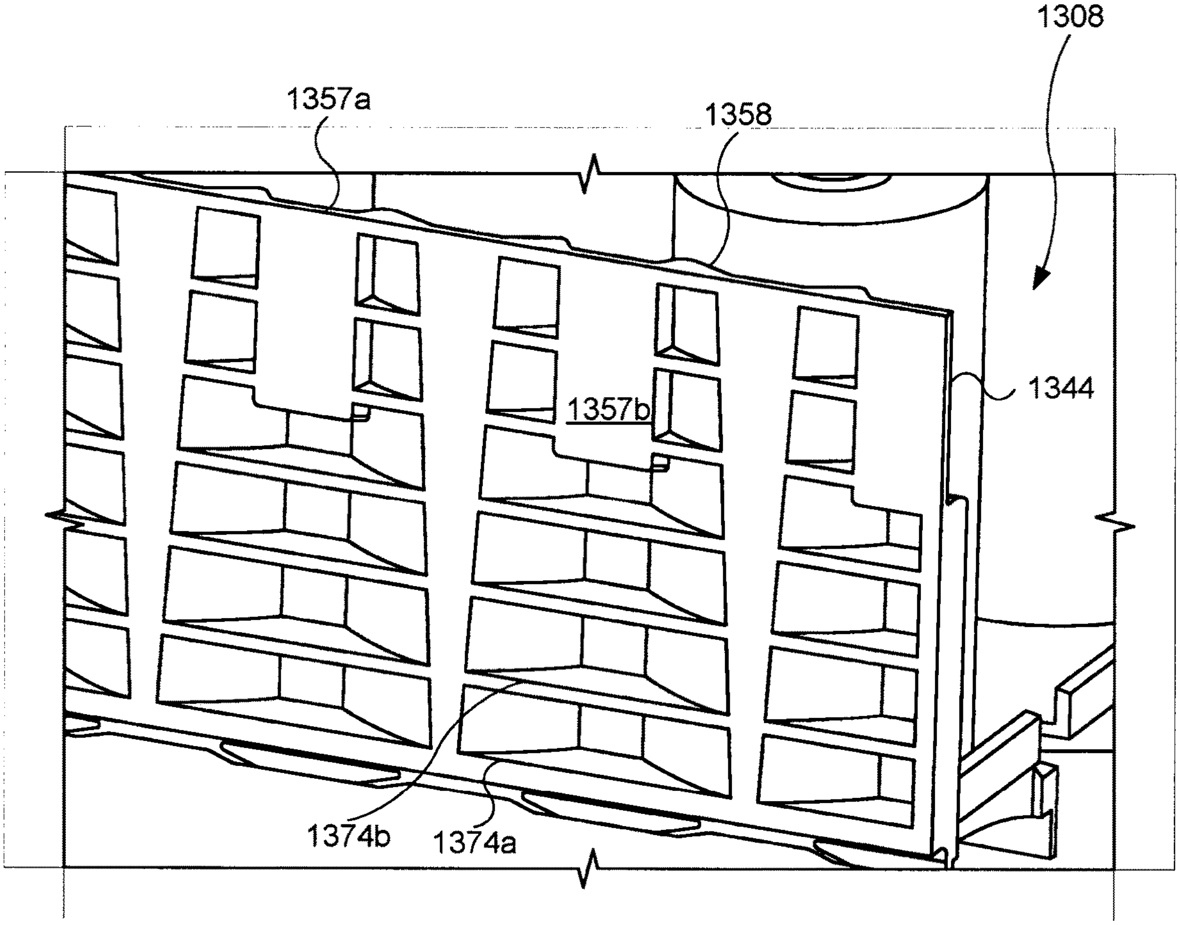
FIG. 24 illustrates a perspective view of a wall of a carrier, in accordance with aspects of the present disclosure.

FIG. 24 illustrates a perspective view of a wall 1344 of a carrier 1208, in accordance with aspects of the present disclosure. The wall 1344 may include similar properties as those of the wall 1144*a* (shown in FIG. 16). For example, the wall 1344 may include a surface 1357*a* with an arc 1358. Additionally, the wall 1344 may include a surface 1357*b* opposite the surface 1357*a*. Several indentations may be formed in the surface 1357*b* of the wall 1344. For example, an indentation 1374*a* and an indentation 1374*b* are formed in the surface 1357*b*. The indentations 1374*a* and 1374*b* may result from a molding operation of the carrier 1308. However, the indentations 1374*a* and 1374*b* may provide regions in which an adhesive (not shown in FIG. 24) can reside, thereby allowing the carrier 1308 to adhesively secure with another object, such as an I-beam (as a non-limiting example).

Figure 25:
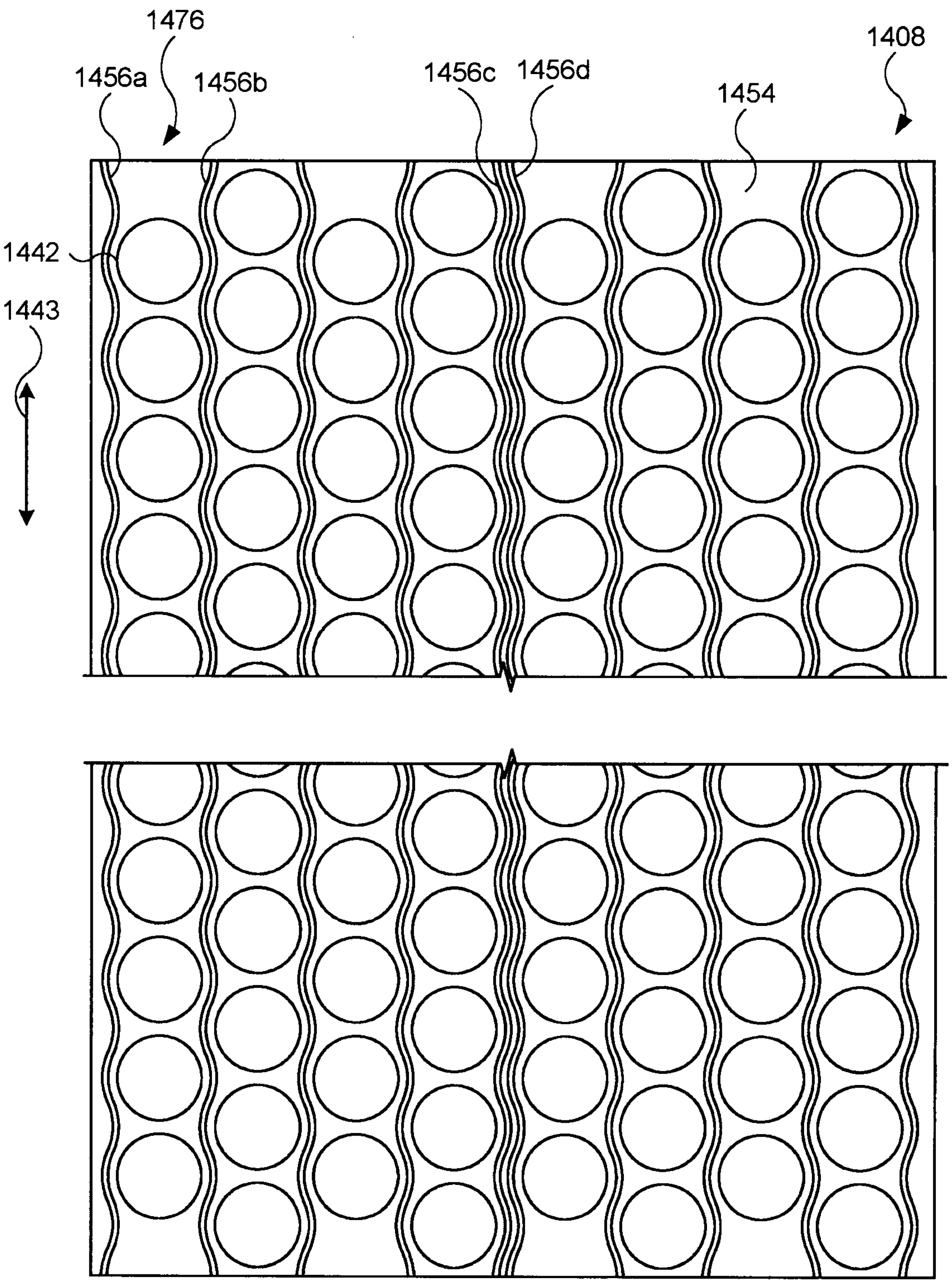
FIG. 25 illustrates an alternate plan view of a carrier, in accordance with aspects of the present disclosure.

FIG. 25 illustrates an alternate plan view of a carrier 1408, in accordance with aspects of the present disclosure. The carrier 1408 includes a surface 1454. The surface may be similar to the surface 1154*b* (shown in FIG. 17), and accordingly, the surface 1354 may be referred to as a bottom surface of the carrier 1408. Several ribs may extend from the surface 1454 of the carrier 1408. For example, a rib 1456*a* and a rib 1456*b* combine to surround a column 1476 of cell bores. Collectively, the ribs 1456*a* and 1456*b* (representative of several additional ribs) combine to form a channel (e.g., vent channel) for gas that pass through any cell bore (e.g., cell bore 1442) in the column 1476 of cell bores. In this manner, the ribs 1456*a* and 1456*b* can direct a gas in two particular directions (e.g., directions of the two-sided arrow 1443). Beneficially, the ribs 1356*a* and 1456*b*, acting as a vent channel, may cause a gas to flow to a vent of a battery pack (not shown in FIG. 25).

Further, a rib 1456*c* and a rib 1456*d* extend from the surface 1454. The ribs 1456*c* and 1456*d* may form part of a respective vent channel. Moreover, the ribs 1356*c* and 1456*d* can align with a wall (not shown) such as a middle wall (e.g., similar to the wall 1144*c* in FIG. 16). Accordingly, the ribs 1456*c* and 1456*c* may be centrally located on the surface 1454. Beneficially, the ribs 1456*c* and 1456*c* ribs, being centrally located ribs, may secure to another structure (not shown in FIG. 25), thus limiting or prevent bending/bowing of the carrier 1408 in response to an external load to the carrier 1408 at the surface 1454. Also, the ribs 1456*c* and 1456*d* may be parallel with respect to each other.

Additionally, as shown in FIG. 25, each of the ribs 1456*a*, 1456*b*, 1456*c*, and 1456*d* extends an edge-to-edge length (representing a major dimension) of the carrier 1408. Accordingly, each of the ribs 1456*a*, 1456*b*, 1456*c*, and 1456*d* includes a dimension equal to, or at least substantially equal to, that of the carrier 1408. Also, as shown, the ribs 1456*b*, 1456*c*, and 1456*d* interweave between adjacent columns of cell bores.

Figure 26:
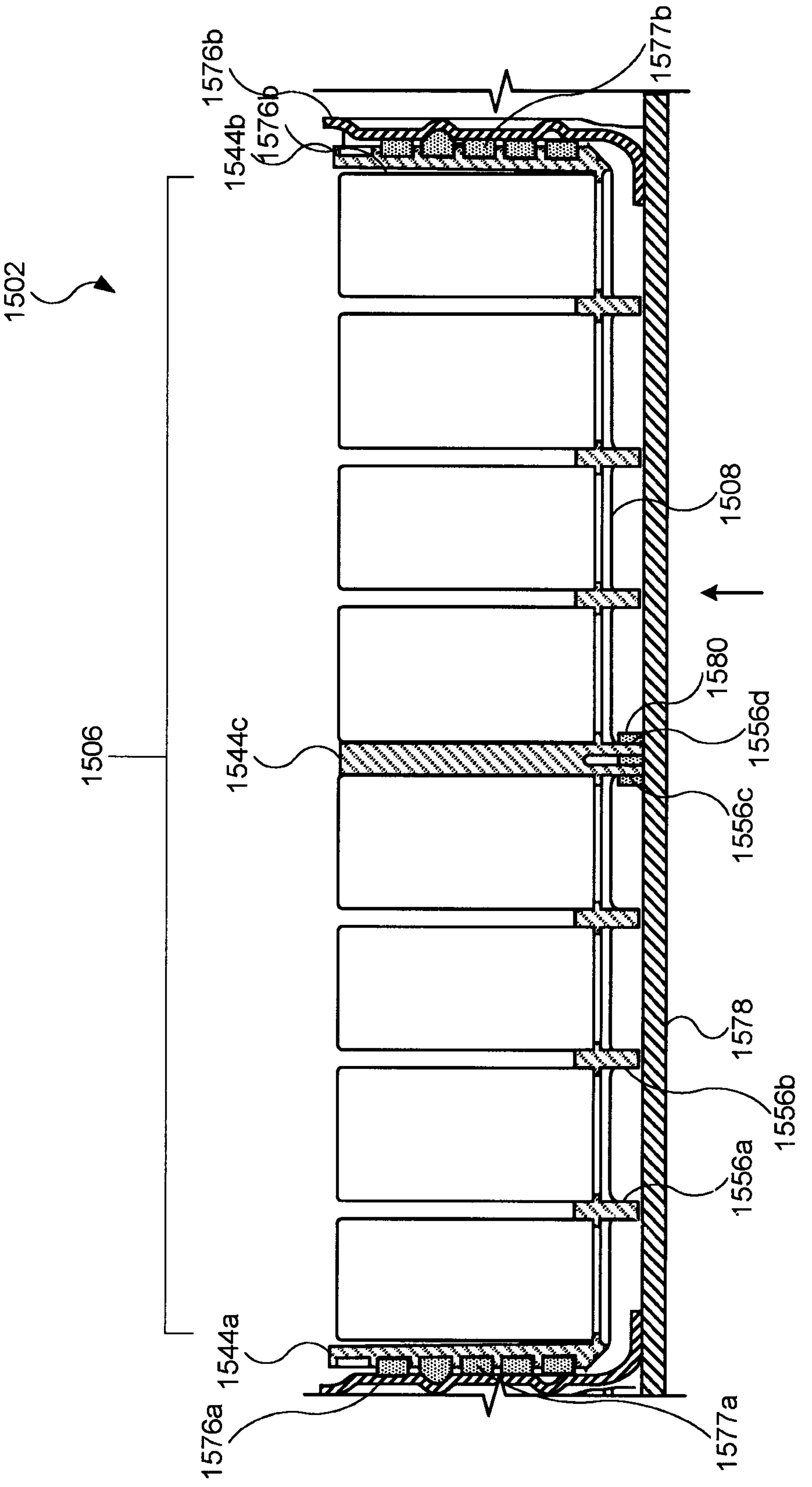
FIG. 26 illustrates a partial cross-sectional view of a battery module of a battery pack, showing additional features of a carrier, in accordance with aspects of the present disclosure.

FIG. 26 illustrates a partial cross-sectional view of a battery module 1502 of a battery pack, showing additional features of a carrier 1508, in accordance with aspects of the present disclosure. As shown, the carrier 1508 includes a wall 1544*a*, a wall 1544*b*, and a wall 1544*c*, and holds battery cells 1506. In order to secure the carrier 1508, the walls 1544*a* and 1544*b* may be secured to an I-beam 1576*a* and an I-beam 1576*b*, respectively. In some embodiments, as shown in FIG. 26, the wall 1544*a* and 1544*b* is secured to an I-beam 1576*a* and an I-beam 1576*b*, respectively, using an adhesive 1577*a* and an adhesive 1577*b*. The adhesive can be at least partially disposed in indentations (e.g., similar to indentations 1374*a* and 1374*b*, shown in FIG. 24).

Additionally, a lid structure 1578 (part of the battery module 1502 or battery pack) provides a support structure for the battery module 1502 as well as other battery modules (not shown in FIG. 26) of the battery pack. As shown in FIG. 26, several ribs extending from the carrier 1508 extend toward the lid structure 1578. For example, the carrier 1508 includes a rib 1556*a* and a rib 1556*b*, each of which extends toward the lid structure 1578. However, based in part on the dimensions (e.g., height) of the I-beams 1576*a* and 1576*b*, a gap or space exists between the lid structure 1578 and the ribs 1556*a* and 1556*b*. However, in some embodiments (not shown) the ribs 1556*a* and 1556*b* contact the lid structure 1578.

Also, the carrier 1508 includes a rib 1556*c* and a rib 1556*d* aligned with the wall 1544*c* (e.g., a centrally located wall). The ribs 1556*c* and 1556*d* secure to the lid structure 1578 by an adhesive 1580. Beneficially, the securing between the lid structure 1578 and the ribs 1556*c* and 1556*d* may limit or prevent damage to the battery cells 1506 in the event of an external load applied to the lid structure 1578 in the direction of the arrow. In some embodiments (not shown in FIG. 26), the lid structure 1578 includes an extension positioned between the ribs 1556*c* and 1556*d*.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases “at least one of A, B, and C” or “at least one of A, B, or C” each refer to only A, only B, or only C; any combination of A, B, and C; and/or at least one of each of A, B, and C.

When an element is referred to herein as being “connected” or “coupled” to another element, it is to be understood that the elements can be directly connected to the other element, or have intervening elements present between the elements. In contrast, when an element is referred to as being “directly connected” or “directly coupled” to another element, it should be understood that no intervening elements are present in the “direct” connection between the elements. However, the existence of a direct connection does not exclude other connections, in which intervening elements may be present.

The predicate words “configured to”, “operable to”, and “programmed to” do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word “exemplary” is used herein to mean “serving as an example, instance, or illustration”. Any embodiment described herein as “exemplary” or as an “example” is not necessarily to be construed as preferred or advantageous over other embodiments. Furthermore, to the extent that the term “include”, “have”, or the like is used in the description or the claims, such term is intended to be inclusive in a manner similar to the term “comprise” as “comprise” is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase “means for” or, in the case of a method claim, the element is recited using the phrase “step for”.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean “one and only one” unless specifically so stated, but rather “one or more”. Unless specifically stated otherwise, the term “some” refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A current collector assembly, comprising:

a first conductor layer disposed in a laminate material having a first opening and a second opening, the first conductor layer comprising:

a first portion extending through the first opening and configured to electrically couple to a first battery cell and a second battery cell, a second portion, and a first extension connected to the first portion and the second portion, wherein:

the first portion extends in a first direction, and the first extension extends in a second direction that is non-perpendicular with respect to the first direction; and a second conductor layer disposed in the laminate material, the second conductor layer comprising a third portion extending in the first direction, the third portion extending through the first opening and configured to electrically couple to the first battery cell, wherein the second opening is configured to receive a potting material.

2. The current collector assembly of claim 1, wherein the second opening does not cover the first battery cell and the second battery cell.

3. The current collector assembly of claim 1, wherein the second direction is non-parallel with respect to the first direction.

4. The current collector assembly of claim 1, wherein the first conductor layer further comprises:

a third portion; and a second extension connected to the second portion and the third portion, wherein:

the third portion extends in the first direction, and the second extension extends in a third direction that is non-perpendicular with respect to the first direction.

5. The current collector assembly of claim 4, wherein the third direction is non-parallel with respect to the first direction and the second direction.

6. The current collector assembly of claim 4, wherein the first conductor layer further comprises:

a fourth portion; and a third extension connected to the third portion and the fourth portion, wherein:

the fourth portion extends in the first direction, and the third extension extends in a fourth direction that is non-perpendicular with respect to the first direction.

7. The current collector assembly of claim 6, further comprising a second conductor layer configured to connect to at least the second battery cell.

8. The current collector assembly of claim 7, wherein the first conductor layer and the second conductor layer are configured to:

electrically couple the first battery cell and the second battery cell in series, and electrically couple the first battery cell and a third battery cell in parallel.

9. The current collector assembly of claim 6, wherein the third extension is non-parallel with respect to the first direction.

10. The current collector assembly of claim 1, wherein the first conductor layer is further configured to electrically couple together in parallel:

the first battery cell in a first column, the second battery cell in a second column different from the first column, a third battery cell in a third column different from the first column and the second column, and a fourth battery cell in a fourth column different from the first column, the second column, and the third column.

11. The current collector assembly of claim 10, wherein the first conductor layer is further configured to electrically couple:

a fifth battery cell in series with the first battery cell, the fifth battery cell in the first column, a sixth battery cell in series with the second battery cell, the sixth batter y cell in the second column, a seventh battery cell in series with the third battery cell, the seventh batter y cell in the third column, and an eighth battery cell in series with the fourth battery cell, the eighth battery cell in the fourth column.

* * * * *